(12) United States Patent
Tsukita et al.

(10) Patent No.: US 9,386,179 B2
(45) Date of Patent: Jul. 5, 2016

(54) APPARATUS MANAGEMENT SYSTEM, APPARATUS MANAGEMENT METHOD AND COMPUTER READABLE INFORMATION RECORDING MEDIUM FOR REPORTING STATUSES OF PLURAL APPARATUSES TO CORRESPONDING USERS

(71) Applicants: Tsuyoshi Tsukita, Tokyo (JP); Ryuji Takayama, Tokyo (JP)

(72) Inventors: Tsuyoshi Tsukita, Tokyo (JP); Ryuji Takayama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/803,834

(22) Filed: Jul. 20, 2015

(65) Prior Publication Data

US 2015/0326740 A1   Nov. 12, 2015

Related U.S. Application Data

(63) Continuation of application No. 13/729,979, filed on Dec. 28, 2012.

(30) Foreign Application Priority Data

Jan. 6, 2012 (JP) .................................. 2012-001562
Nov. 30, 2012 (JP) .................................. 2012-262102

(51) Int. Cl.
*H04N 1/00* (2006.01)
*H04L 29/08* (2006.01)
*G06Q 10/06* (2012.01)

(52) U.S. Cl.
CPC ............ *H04N 1/00912* (2013.01); *G06Q 10/06* (2013.01); *H04L 67/125* (2013.01); *H04N 1/00344* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS

| | | |
|---|---|---|
| 2002/0087350 A1 | 7/2002 | Miida et al. |
| 2005/0004893 A1 | 1/2005 | Sangroniz et al. |
| 2005/0050466 A1 | 3/2005 | Sangroniz et al. |
| 2005/0175240 A1* | 8/2005 | Parry ..................... G03G 15/50 382/182 |
| 2006/0170962 A1* | 8/2006 | Nakamura ......... H04N 1/00244 358/1.15 |
| 2008/0137130 A1* | 6/2008 | Ferlitsch ................. G06F 11/34 358/1.15 |

* cited by examiner

*Primary Examiner* — Jeremiah Bryar
(74) *Attorney, Agent, or Firm* — Oblon, McClelland, Maier & Neustadt, L.L.P.

(57) ABSTRACT

An apparatus management system includes a first apparatus; a second apparatus having an apparatus type different from the first apparatus; and an apparatus management configuration connected via a network with the first apparatus and the second apparatus, and managing the apparatuses. The apparatus management configuration includes a reception part that receives apparatus information that includes apparatus type identifiers for identifying the apparatus types of the first apparatus and the second apparatus; and a control part that carries out control to generate management information according to the apparatus types, based on the apparatus type identifiers.

9 Claims, 33 Drawing Sheets

FIG.4A

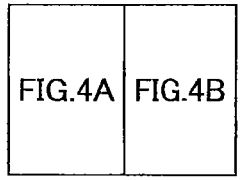

| INFORMATION CODE | PARAMETER VALUE | DESCRIPTION |
|---|---|---|
| 000 | 00020 | CUSTOMER ID |
| 001 | 2011/12/1 0:00 | OBTAINED TIME |
| 002 | MFP XX model | PRODUCT NAME |
| 003 | MFP00002445 | SERIAL NUMBER |
| 005 | ver3.03 | MAIN SUBSTRATE SOFTWARE VERSION |
| 006 | ver4.00 | NETWORK SUBSTRATE SOFTWARE VERSION |
| 007 | ver2.01 | NETWORK SUBSTRATE COMMUNICATION CONTROL SOFTWARE VERSION |
| 010 | SALES DIVISION | INSTALLED PLACE |
| 011 | 1235 | TOTAL OUTPUT NUMBER OF SHEETS |
| 012 | 125 | DUPLEX OUTPUT NUMBER OF SHEETS |
| 013 | 254 | N IN 1 OUTPUT NUMBER OF SHEETS |
| 014 | 365 | COLOR PRINTING NUMBER OF SHEETS |
| 015 | 01620H-25M-04S | TOTAL TIME |
| 016 | 00420H-32M-10S | ENERGY SAVING MODE |
| : | : | : |

FIG.4B

| |
|---|
| CUSTOMER ID OF CUSTOMER AT WHICH APPARATUS IS INSTALLED |
| OBTAINED TIME OF APPARATUS INFORMATION |
| PRODUCT NAME OR MODEL OF TARGET APPARATUS TYPE |
| PRODUCT SERIAL NUMBER |
| VERSION OF SOFTWARE INSTALLED IN MAIN SUBSTRATE |
| VERSION OF SOFTWARE INSTALLED IN NETWORK SUBSTRATE |
| VERSION OF SOFTWARE FOR COMMUNICATION CONTROL INSTALLED IN NETWORK SUBSTRATE |
| INSTALLED PLACE |
| CUMULATIVE TOTAL OUTPUT NUMBER OF SHEETS |
| OUTPUT NUMBER OF SHEETS FOR DUPLEX PRINTING |
| OUTPUT NUMBER OF SHEETS FOR N IN 1 PRINTING |
| NUMBER OF SHEETS FOR COLOR PRINTING |
| TOTAL TIME OF STARTING UP THE APPARATUS |
| ENERGY SAVING STANDBY TIME |
| : |

FIG.5A

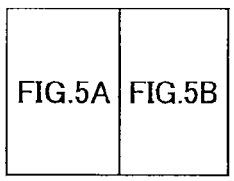

| INFORMATION CODE | PARAMETER VALUE | DESCRIPTION |
| --- | --- | --- |
| 000 | 00020 | CUSTOMER ID |
| 001 | 2011/12/1 0:00 | OBTAINED TIME |
| 002 | PJ001 | PRODUCT NAME |
| 003 | PJ000A10001 | SERIAL NUMBER |
| 101 | A000000001 | ENGINE NUMBER |
| 005 | ver1.00 | MAIN SUBSTRATE SOFTWARE VERSION |
| 006 | ver1.00 | NETWORK SUBSTRATE SOFTWARE VERSION |
| 007 | ver1.00 | NETWORK SUBSTRATE COMMUNICATION CONTROL SOFTWARE VERSION |
| 102 | 00016H-26M-04S | LAMP TIME |
| 016 | 00020H-26M-04S | TOTAL TIME |
| 104 | 00012H-26M-04S | TOTAL ECO-MODE LAMP TIME |
| 105 | 00014H-13M-02S | LAMP STANDARD CONVERTED TIME |
| 106 | 0 | LAMP RESET NUMBER OF TIMES |
| 107 | 3000 | LAMP DURABILITY TIME (STANDARD) |
| 108 | 4000 | LAMP DURABILITY TIME (ECO) |
| 109 | 1 | NUMBER OF MOUNTED LAMPS |
| : | : | : |

FIG.5B

| |
|---|
| CUSTOMER ID OF CUSTOMER AT WHICH APPARATUS IS INSTALLED |
| OBTAINED TIME OF APPARATUS INFORMATION |
| PRODUCT NAME OR MODEL OF TARGET APPARATUS TYPE |
| PRODUCT SERIAL NUMBER |
| SERIAL NUMBER OF OPTICAL ENGINE |
| VERSION OF SOFTWARE INSTALLED IN MAIN SUBSTRATE |
| VERSION OF SOFTWARE INSTALLED IN NETWORK SUBSTRATE |
| VERSION OF SOFTWARE FOR COMMUNICATION CONTROL INSTALLED IN NETWORK SUBSTRATE |
| OPERATING TIME OF LAMPS (SUM TOTAL OF OPERATING TIMES IN STANDARD MODE AND ECO MODE) (TO BE RESET UPON LAMP REPLACEMENT) |
| TOTAL OPERATING TIME OF THE APPARATUS (UNIT: HOURS) I.E., LAMP LIGHTING GROSS TIME (NOT TO BE RESET UPON LAMP REPLACEMENT) |
| LAMP LIGHTING GROSS TIME IN ECO-MODE (NOT TO BE RESET UPON LAMP REPLACEMENT) |
| SUM TOTAL OF LAMP OPERATING TIME IN STANDARD MODE AND LAMP OPERATING TIME IN ECO-MODE CONVERTED INTO LAMP OPERATING TIME IN STANDARD MODE (TO BE RESET UPON LAMP REPLACEMENT) |
| NUMBER OF TIMES OF RESETTING LAMP OPERATING TIME |
| LAMP DURABILITY TIME IN CASE OF OPERATING WITH LAMP POWER "STANDARD" |
| LAMP DURABILITY TIME IN CASE OF OPERATING WITH LAMP POWER "ECO" |
| NUMBER OF MOUNTED LAMPS |
| : |

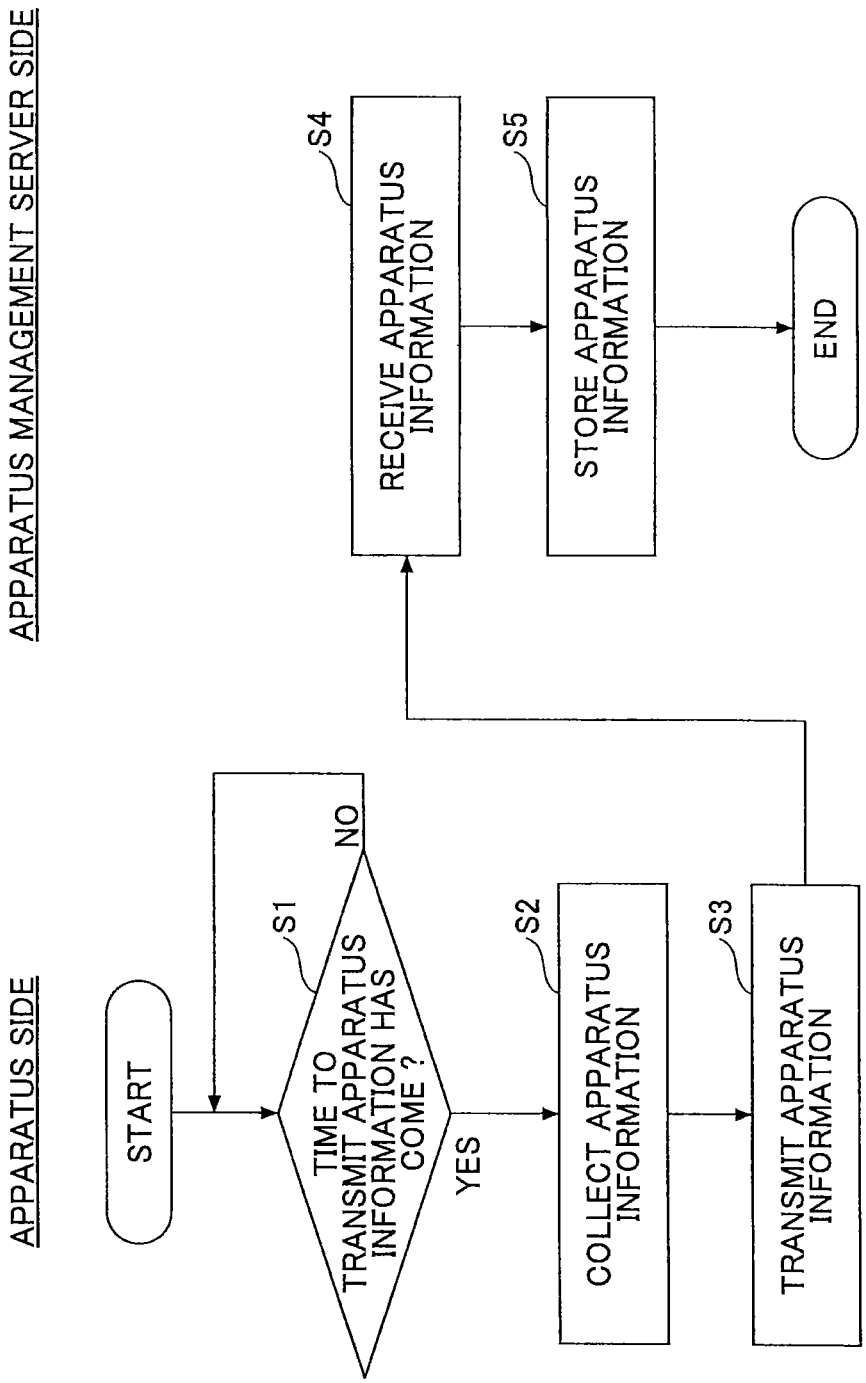

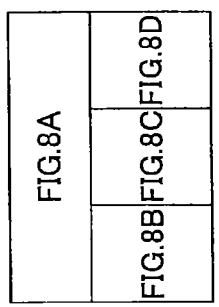
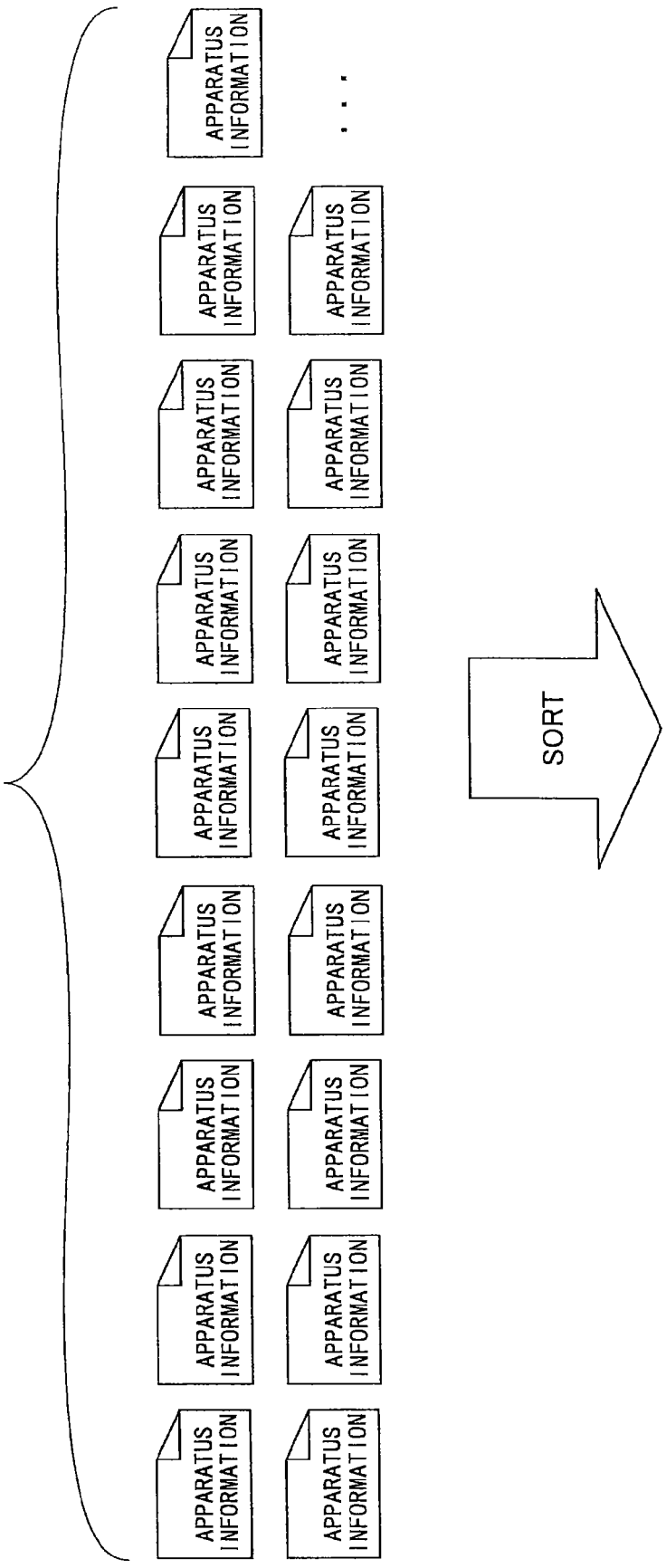
FIG.8A

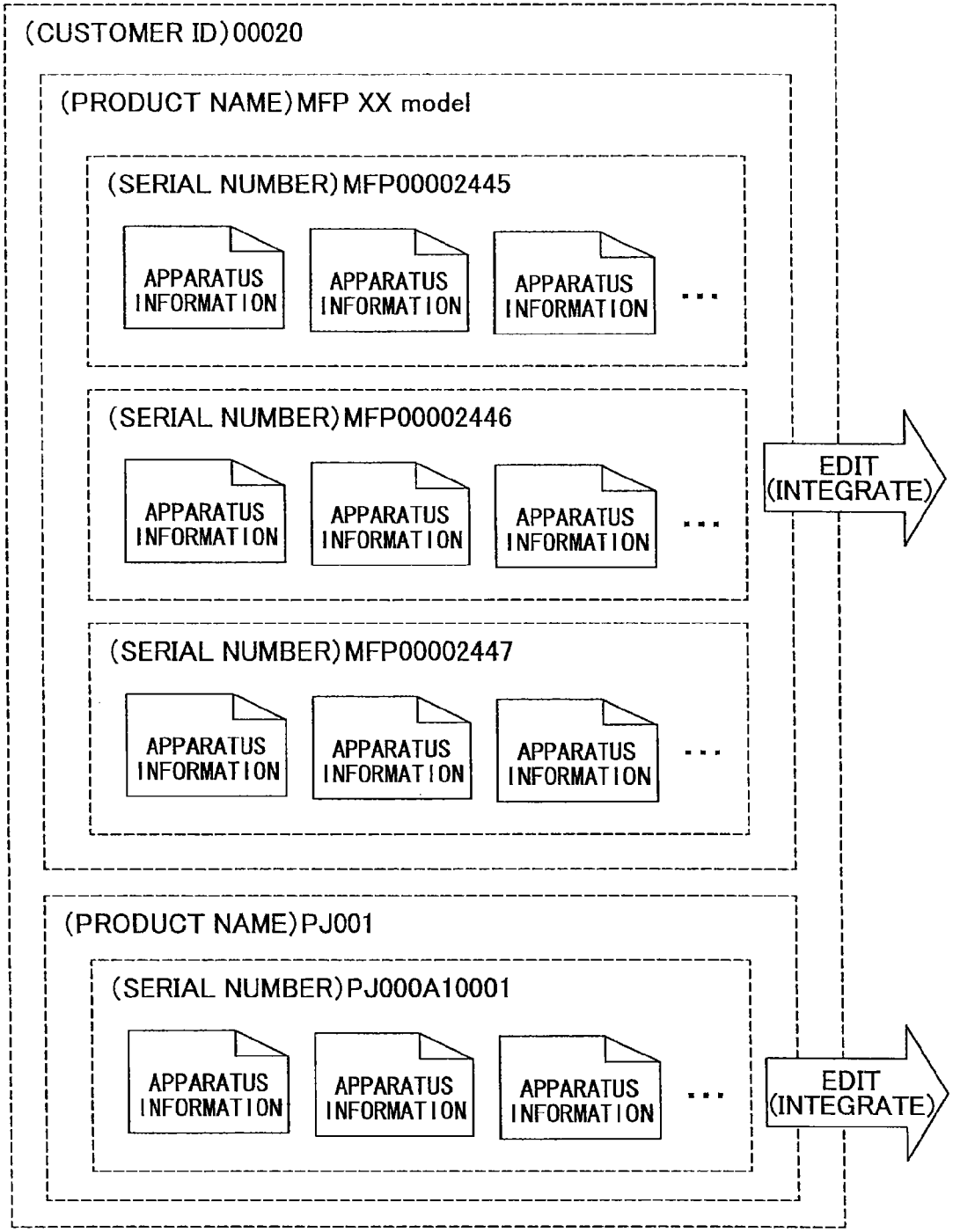

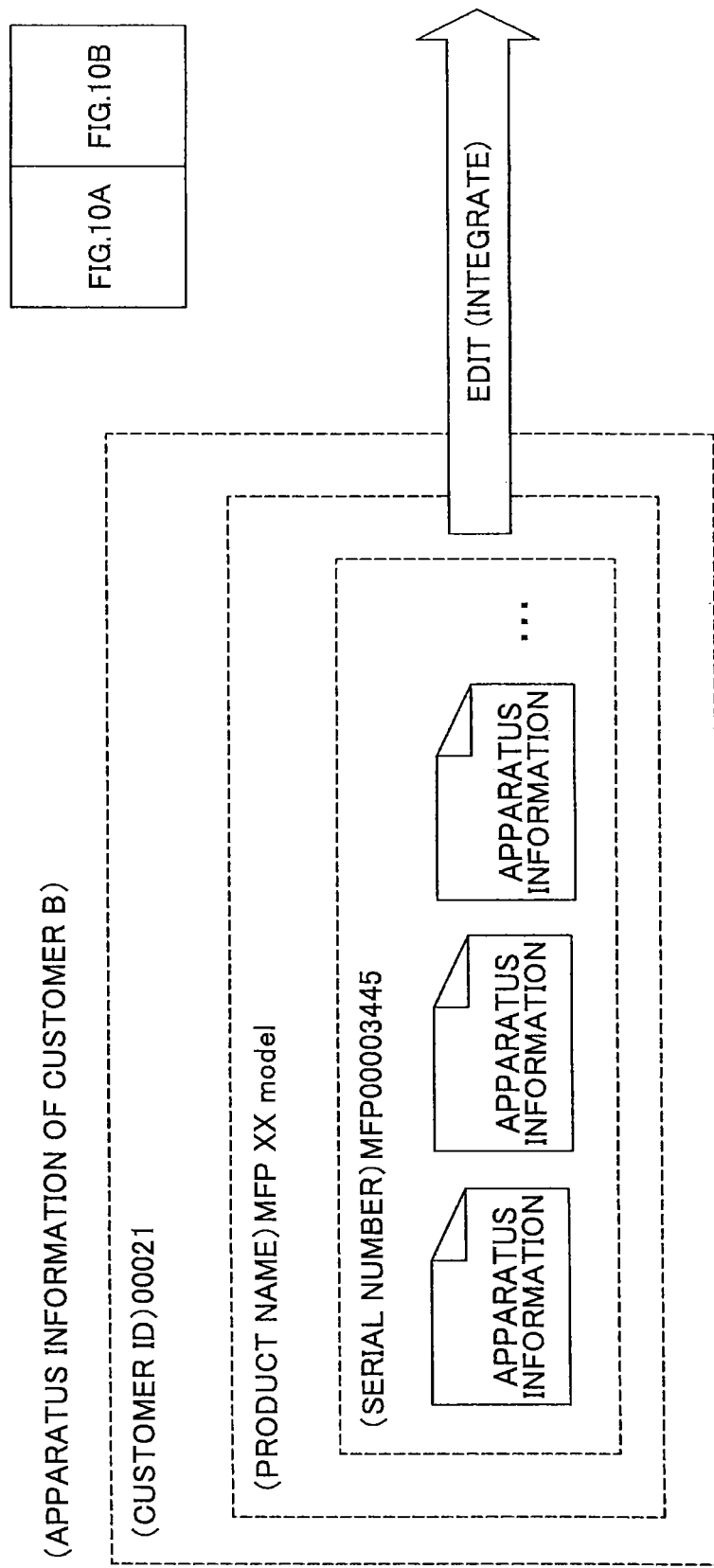

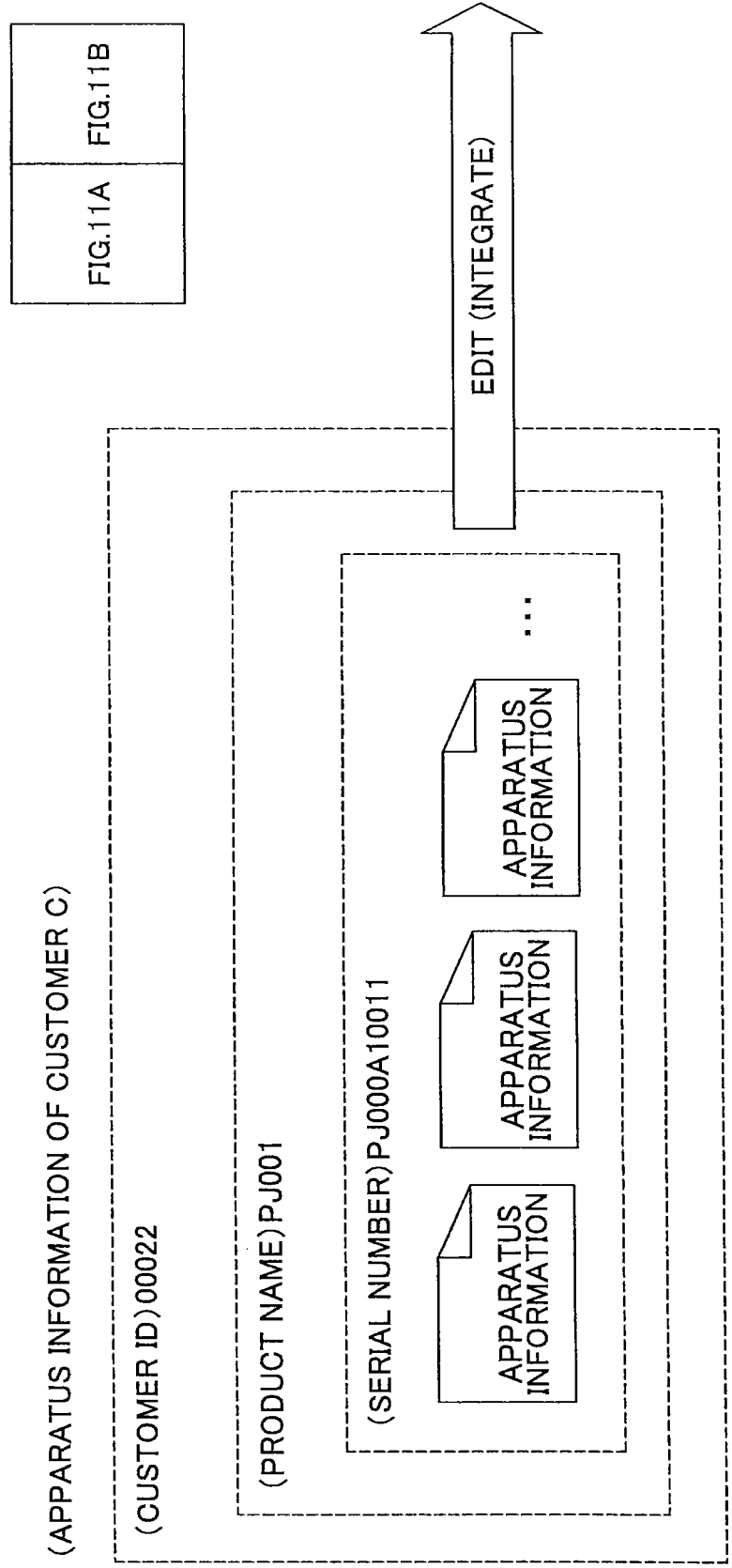

FIG.12A
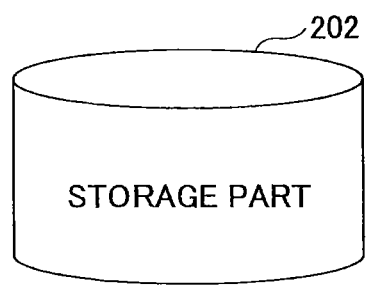
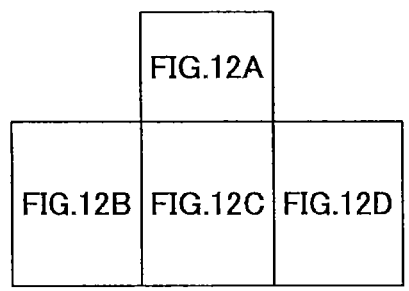

FIG.12C (APPARATUS INFORMATION OF CUSTOMER B)

(CUSTOMER ID)00021

MFP XX model
(USE STATUS PARAMETER)

MFP XX model
(ENVIRONMENT PARAMETER)

MFP XX model
(MAINTENANCE PARAMETER)

FIG.12D
(APPARATUS INFORMATION OF CUSTOMER C)
(CUSTOMER ID)00022
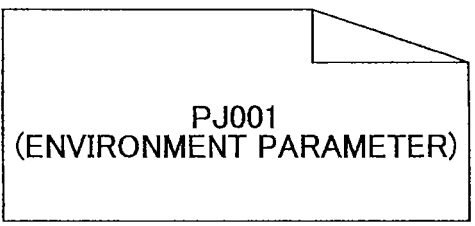
PJ001
(ENVIRONMENT PARAMETER)
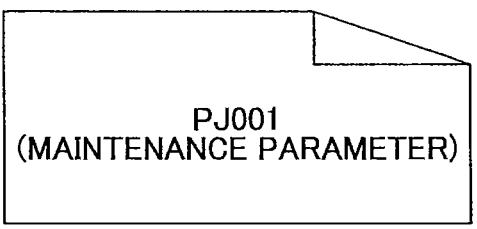
PJ001
(MAINTENANCE PARAMETER)

① ECO MODE UTILIZATION RATE

● OPERATING TIME (HOURS)

| | |
|---|---|
| STANDARD MODE | 570 |
| ECO MODE | 835 |

・ECO MODE UTILIZATION RATE    59.43%

[OPERATING TIME RATES FOR RESPECTIVE MODES]

59.43%
40.57%

②ENVIRONMENTAL LOAD REDUCTION EFFECT BY UTILIZING ECO MODE

●CONSUMED ELECTRIC ENERGY(kWh)

| CONSUMED ELECTRIC ENERGY | 349.31 |
|---|---|
| REDUCTION RATE BY ECO MODE | 51.54 |

▶ ●$CO_2$ EMISSION VOLUME (kg-$CO_2$)

| $CO_2$ EMISSION VOLUME | 195.96 |
|---|---|
| REDUCTION RATE BY ECO MODE | 28.91 |

▶ ●TREE CONVERSION (NUMBER OF TREES)

| TREE CONVERSION | 229 |
|---|---|
| REDUCTION RATE BY ECO MODE | 34 |

・$CO_2$ REDUCTION EFFECT    12.86%

[$CO_2$ REDUCTION EFFECT]

APPARATUS MANAGEMENT SYSTEM, APPARATUS MANAGEMENT METHOD AND COMPUTER READABLE INFORMATION RECORDING MEDIUM FOR REPORTING STATUSES OF PLURAL APPARATUSES TO CORRESPONDING USERS

CROSS REFERENCE TO RELATED APPLICATION

The present continuation application claims the benefit of priority under 35 U.S.C. 120 to application Ser. No. 13/729,979, filed Dec. 28, 2012 and claims the benefit of priority under 35 U.S.C. 119 from Japanese Application No. 2012-001562, filed on Jan. 6, 2012 and Japanese Application No. 2012-262102, filed on Nov. 30, 2012, the entire contents of all of which are hereby incorporated herein by reference.

BACKGROUND OF THE INVENTION

1. Field of the Invention

The present invention relates to an apparatus management system, an apparatus management method and a computer readable information recording medium.

2. Description of the Related Art

An art has been known in which in an apparatus management system (also called a "remote apparatus management system", a "remote apparatus monitoring system" or the like), an apparatus management configuration collects via a network, from apparatuses that are management targets, apparatus information concerning these apparatuses. There are various purposes to utilize such apparatus information. For example, an apparatus management center collects apparatus information concerning used amounts (for example, the number of printed sheets) of apparatuses (for example, multifunction peripherals (MFPs)) located at a customer side. The thus-collected apparatus information can be used as accounting information for the customer.

Further, from a maintenance viewpoint, the states of apparatuses at a customer side are monitored remotely, and apparatus information is collected concerning the states of the apparatuses. Then, if it is found from the collected apparatus information that the remaining amount of a consumable (for example, a toner or so) is insufficient, a maintenance staff can make an on-site arrangement to supplement the consumable. If a fault of the apparatus or a sign thereof has been detected from the collected apparatus information, a maintenance staff can deal with the fault on site or remotely.

Further, it is also possible to utilize apparatus information (data) for creating a customer report. An apparatus management center periodically creates, based on collected apparatus information, a report in which the working situation, the remaining amounts of the consumables, the fault status and so forth of the apparatus are summarized, and provides the report to the customer side. Further, because of recent raising of environmental awareness, in the report, not only simply collected data but also an index value(s) such as a $CO_2$ used amount converted value, a tree converted value and/or the like derived from collected data, and/or the like, may appear.

Further, such a report may also be used by a sales staff for operating activities. For example, a sales staff analyses, based on such a report, the status of use or so of an apparatus(es) for each customer. Then, the sales staff may propose a more preferable improvement plan and/or a new product for the customer, and thus, the report can be used for sales promotion of product lines of the sales staff.

For example, Patent Reference No. 1 (Japanese Laid-Open Patent Application No. 2002-269293) describes an art concerning this point. Patent Reference No. 1 describes a customer apparatus information providing system and so forth. The customer apparatus information providing system provides information concerning an apparatus that is being used in accordance with the needs of the person who is using the apparatus to this person as is necessary in an appropriate manner. Also, this system modifies the information concerning the apparatus, provides the modified information to the person who utilizes the information and assists the person.

A case will now be considered where, for example, when a new apparatus has been brought into the market and/or a business operator starts to handle a new apparatus of another manufacturer, the business operator may carry out remote apparatus management also for an apparatus different from those that are the existing management targets. When the new apparatus is of the same apparatus type or the same type as that of those that are the existing management targets, the framework of the apparatus management system is used as is, to carry out remote apparatus management also for the new apparatus.

However, when the new apparatus is completely different or has a considerably different type from those that are the existing management targets, it may be difficult to carry out remote apparatus management for the new apparatus utilizing the framework of the existing apparatus management system. Thus, in such a case, since apparatus information periodically transmitted from the new apparatus may also be different from the apparatus of those that are the existing management targets, it may be necessary to implement an apparatus management system for managing the new apparatus on the side of the apparatus management configuration of the apparatus management center. In such a case, a certain amount of cost may be required until actually carrying out remote apparatus management of the new apparatus.

SUMMARY OF THE INVENTION

According to an embodiment, an apparatus management system includes a first apparatus; a second apparatus having an apparatus type different from the first apparatus; and an apparatus management configuration connected via a network with the first apparatus and the second apparatus and managing the apparatuses. The apparatus management configuration includes a reception part that receives apparatus information that includes apparatus type identifiers for identifying the apparatus types of the first apparatus and the second apparatus; and a control part that carries out control to generate management information according to the apparatus types, based on the apparatus type identifiers.

Other objects, features and advantages of the present invention will become more apparent from the following detailed description when read in conjunction with the accompanying drawings.

BRIEF DESCRIPTION OF THE DRAWINGS

FIGS. 4A and 4B show one example of apparatus information of a MFP according to the embodiment;

FIGS. 5A and 5B show one example of apparatus information of a projector according to the embodiment;

FIG. 6 shows a flowchart of transmission and reception processes of apparatus information according to the embodiment;

FIGS. 8A, 8B, 8C and 8D show how sorting of apparatus information is carried out according to the embodiment;

FIGS. 9A, 9B and 9C show one example of apparatus information edited files (customer A) according to the embodiment;

FIGS. 10A and 10B show one example of apparatus information edited files (customer B) according to the embodiment;

FIGS. 11A and 11B show one example of apparatus information edited files (customer C) according to the embodiment;

FIGS. 12A, 12B, 12C and 12D show apparatus information edited files (customers A, B and C) according to the embodiment;

DETAILED DESCRIPTION OF THE EMBODIMENTS

Below, the embodiments will be described using the figures.
[System Configuration]
(General Configuration)

Figure 1:
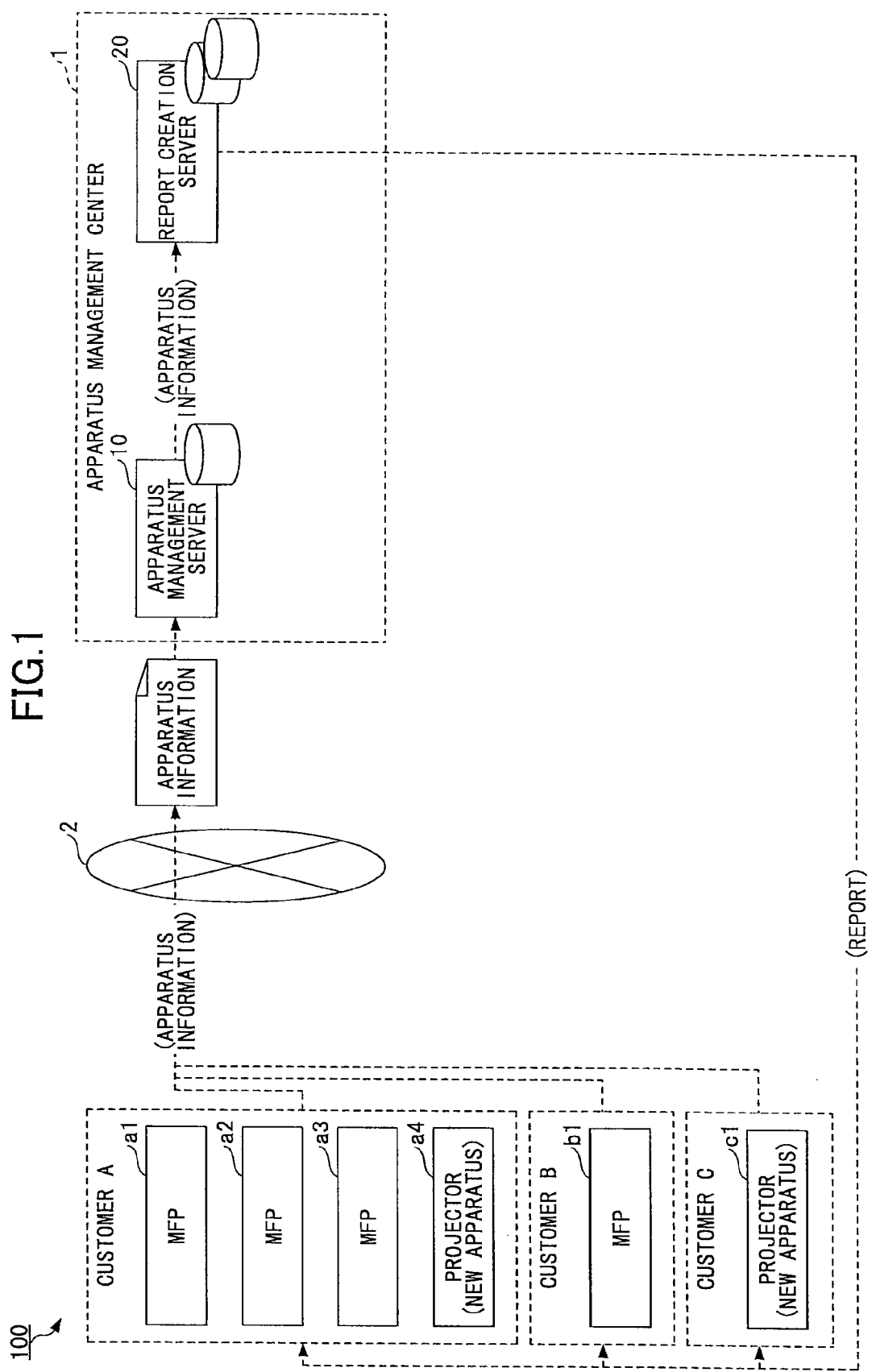
FIG. 1 shows a configuration of an apparatus management system 100 according to an embodiment.

First, before describing detailed contents of the embodiments, a general configuration of the embodiment will be described. FIG. 1 shows a configuration of an apparatus management system 100 according to the embodiment. As shown, in an apparatus management system 100 according to the embodiment, an apparatus management center (apparatus management configuration) 1 and customer sites A, B and C are mutually connected via a network 2.

The apparatus management center 1 includes an apparatus management server 10 and a report creation server 20. The apparatus management center 1 is a management center that carries out remote management (monitoring) of a customer site as a management site (that may be plural sites) which the apparatus management center 1 has a maintenance contract with.

The apparatus management server 10 receives apparatus information from apparatuses installed in the customer sites A, B and C periodically or at any timing, and stores the received apparatus information. Further, from a maintenance viewpoint, the apparatus management server 10 monitors the status of the respective apparatuses based on the apparatus information. Then, if it is found from the collected apparatus information that, for example, the remaining amount of a consumable (for example, a toner or so) is insufficient, a maintenance staff can make an on-site arrangement to supplement the consumable. If a fault of the apparatus or a sign thereof has been detected from the collected apparatus information, a maintenance staff can deal with the fault, on site or remotely.

Further, it is also possible to utilize the apparatus information (data) for creating a customer report. The report creation server 20 periodically (for example, once a month) creates, based on the apparatus information collected and stored by the apparatus management server 10, a report in which the working situation, the remaining amounts of consumables, fault status and so forth of the apparatus are summarized.

Further, a billing system (not shown) may be linked with the apparatus management system 100, and may create a bill or the like based on accounting information (for example, apparatus information concerning a used amount of the apparatus) included in the apparatus information collected and stored by the apparatus management server 10.

Each one of the customer sites A, B and C is a customer network environment including apparatuses that are management targets of the apparatus management center 1. Thus, in the customer site, a local area network (LAN) or the like, for example, is built by the apparatus(es) as the management target(s). Further, there are plural customer sites A, B and C. For example, as shown, the customer sites A, B and C are connected with the apparatus management server 10, and the apparatuses installed in the respective customer sites A, B and C are the management target apparatuses.

In the embodiment, as shown in FIG. 1, the customer site A has three "MFPs" a1, a2 and a3 and one projector a4. The MFPs a1 to a3 are, as one example of installed apparatuses, digital MFPs, in each one of which plural functions such as a scanner function, a copy function, a printer function and a facsimile function are included in a single housing. The projector a4 is a projector used for projecting an image in a meeting or the like. The customer site B includes one "MFP" b1, and the customer site C includes one "projector" (which may also be referred to as "PJ") c1.

According to the embodiment, the MFPs and projectors have the following relationship. According to the embodiment, a business operator (the apparatus management center 1) has been carrying out remote apparatus management for the MFPs of the existing management target apparatuses. Then, at a certain point of time, projectors which have been newly brought into the market as new apparatuses, or for another reason, will be brought into the existing environment. The business operator (apparatus management center 1) will carry out remote apparatus management also for the projectors that are the new apparatuses, the same as for the MFPs.

Thus, for example, in the customer site A, remote apparatus management has been carried out for the three MFPs a1 to a3 before the new projectors have been brought into the market. Then, the new projector will be introduced into the customer site A as the projectors are on sale, and thus, remote apparatus management will be carried out also for the newly introduced projector a4 the same as for the MFPs a1 to a3 that are the existing apparatuses. On the other hand, in the customer site B, the single MFP b1 has been introduced before or after the projectors have been brought into the market. After that, remote apparatus management has been being carried out for the MFP b1. In the customer site C, the projector c1 will be newly introduced as the projectors are on sale, and remote apparatus management will be carried out for the newly introduced projector c1.

Further, according to the embodiment, each one of the apparatuses that are the management targets of the apparatus management center 1 has a predetermined management program for collecting the apparatus information. This program is installed in the apparatus acting as the management target at the time of shipping or at the time of starting the management. After the management program is thus installed, the apparatus acting as the management target can collect the apparatus information concerning itself, and transmit the collected apparatus information to the apparatus management server 10 of the apparatus management center 1 periodically or at any timing.

It is noted that the contents of the apparatus information transmitted from the apparatus depends on the apparatus (apparatus type). For example, in a case where the apparatus is the MFP, the apparatus information based on the MFP is transmitted. In a case where the apparatus is the projector, the apparatus information based on the projector is transmitted. More specifically, for example, the apparatus information of the MFP includes a value (parameter) indicating the number of printed sheets. On the other hand, such a value is not included in the apparatus information of the projector. This is because the projector has no printing function.

Finally, the network 2 is a network connecting the customer sites A to C with the apparatus management center 1. Specifically, the network 2 is ISDN, the Internet, a private line or the like.

(Hardware)

Figure 2:
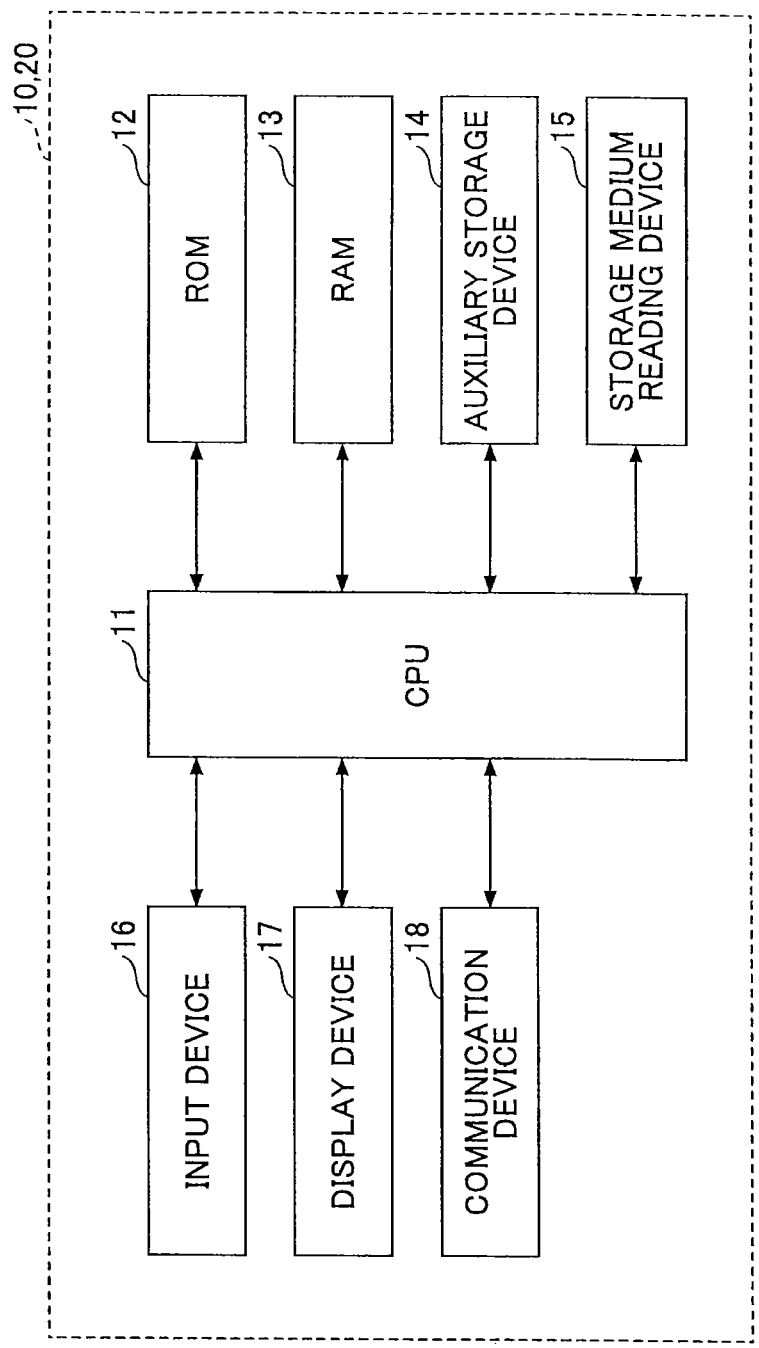
FIG. 2 shows a general hardware configuration of each one of an apparatus management server 10 and a report creation server 20 according to the embodiment.

FIG. 2 shows a general hardware configuration diagram of the apparatus management server 10 and the report creation server 20 according to the embodiment. Each one of the apparatus management server 10 and the report creation server 20 includes a central processing unit (CPU) 11, a read-only memory (ROM) 12, a random access memory (RAM) 13, an auxiliary storage device 14, a storage medium reading device 15, an input device 16, a display device 17 and a communication device 18.

The CPU 11 includes a microprocessor and peripheral circuits thereof, and is a circuit that controls the entirety of the respective one of the apparatus management server 10 and the report creation server 20. The ROM 12 is a memory storing a predetermined control program (software component) to be executed by the CPU 11. The RAM 13 is a memory to be used as a work area when the CPU 11 executes various programs to carry out various control operations.

The auxiliary storage device 14 is a device storing various sorts of information including a general-purpose operating system (OS), a program(s) and a database(s) (DB(s)). A hard disk drive (HDD) that is a non-volatile storage device or the like is used as the auxiliary storage device 14. By setting a portable medium such as a USB memory, a CD, a DVD or the like to the storage medium reading device 15, it is possible to obtain information from the outside.

The input device 16 is a device for a user to carry out various input operations. The input device 16 includes a mouse, a keyboard, a touch panel switch provided to be superposed on the display screen of the display device 17 and/or the like. The display device 17 is a device for displaying various sorts of data on the display screen. For example, a liquid crystal device (LCD), a cathode ray tube (CRT) or the like is used as the display device 17. The communication device 18 is a device for carrying out communication with another apparatus via a network. The communication device 18 supports communication according to a network. Specific examples of the network include various sorts such as a wired network, a wireless network and so forth.

The hardware configurations of the MFPs and the projectors at the customer sides can be conventional ones, and the description thereof will be omitted.

(Function)

Figure 3:
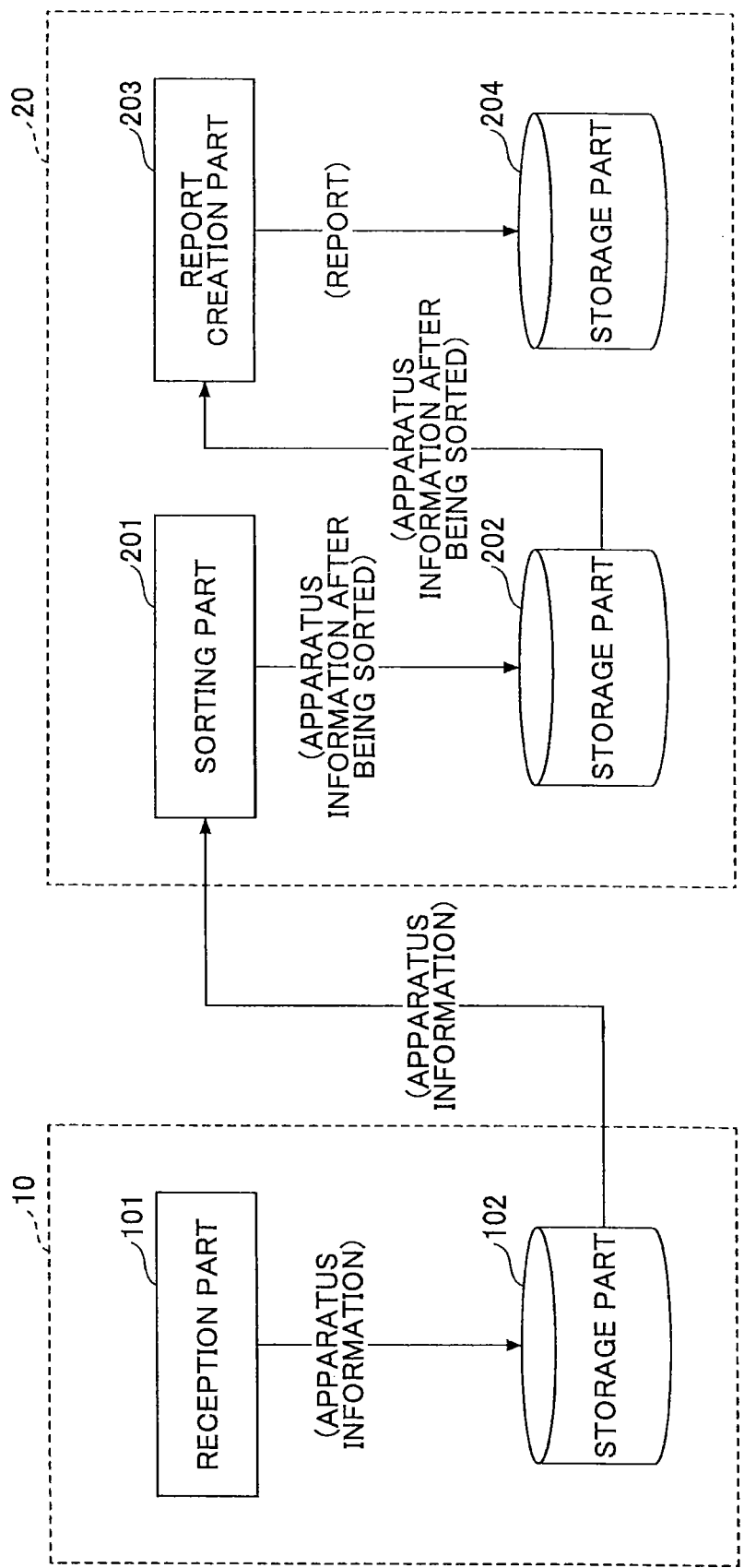
FIG. 3 shows a general functional block diagram of the apparatus management server 10 and the report creation server 20 according to the embodiment.

Next, functions of the apparatus management server 10 and the report creation server 20 according to the embodiment will be described. FIG. 3 shows a general functional block diagram of functions of the apparatus management server 10 and the report creation server 20 according to the embodiment.

The apparatus management server 10 includes a reception part 101 and a storage part 102.

The reception part 101 receives the apparatus information including at least customer identifiers, apparatus identifiers, apparatus type identifiers and apparatus unique parameters of the apparatuses from the apparatuses acting as the management targets installed at the customer sites such as the customer sites A to C. As mentioned above, the management programs for collecting the apparatus information are installed in the apparatuses acting as the management targets. Each one of the apparatuses acting as the management targets internally collects the information concerning itself, and transmits the collected apparatus information to the apparatus management server 10 of the apparatus management center 1 periodically or at any timing. The apparatus information will be described again later citing specific examples.

The storage part 102 stores the apparatus information received by the reception part 101. It is noted that the stored apparatus information includes all the apparatus information received by the reception part 101. Thus, the apparatus information received from the respective customer sites A to C is mixed in the stored apparatus information. Further, the stored apparatus information received from the same customer site A includes the apparatus information received from the MFPs a1 to a3 and the projector a4. Thus, the apparatus information received from the MFPs a1 to a3 and the projector a4 is mixed in the stored apparatus information.

The report creation server 20 includes a sorting part 201, a storage part 202, a report creation part 203 and a storage part 204.

Based on identifiers such as the customer identifiers, the apparatus type identifiers and apparatus identifiers included in the apparatus information, the sorting part 201 sorts the apparatus information stored by the storage part 102 of the apparatus management server 10 for the respective customers, for the respective apparatus types and for the respective apparatuses.

The storage part 202 stores the apparatus information, thus sorted by the sorting part 201, for the respective customers, for the respective apparatus types and for the respective apparatuses.

The report creation part (management information generation part) 203 creates reports (management information), for managing the apparatuses, for the respective customers, based on the apparatus information stored by the storage part 202 and sorted for the respective customers, for the respective apparatus types and for the respective apparatuses. The reports thus created for the respective customers are reports to be provided to the respective customers periodically, and are reports in each one of which the working situation, the remaining amounts of the consumables, the fault status and so forth of the apparatus are summarized based on the apparatus information collected by the apparatus management center 1. The reports will be described again later citing specific examples.

The storage part 204 stores for the respective customers the reports thus created by the report creation part 203. The reports thus stored are those to be provided to the customers. Specific examples of a method of providing the reports include a method of transmitting the reports to the customers using e-mail and a method of preparing a Web site for reading the reports and providing the reports via the Web site.

Thus, general functional configurations of the apparatus management server 10 and the report creation server 20 have been described. It is noted that these functions of the respective servers 10 and 20 are actually realized by the computers based on programs executed by the CPUs 11 of the respective servers 10 and 20.

(Examples of Apparatus Information)

FIGS. 4A and 4B show one example of the apparatus information of the MFP according to the embodiment. As shown in a layout diagram at the top left corner of FIG. 4A, FIGS. 4A and 4B are integrated into one figure.

As shown, the apparatus information of the MFP is information concerning the corresponding apparatus including "information codes" and "parameter values". The "information codes" are codes uniquely defined for identifying the corresponding "parameter values". For example, in a case where the "information code" is "000", the "parameter value": 00020 thereof indicates a customer ID. That is, when the apparatus information including the "information code": 000 and the "parameter value": 00020 is transmitted from the MFP side, the side of the apparatus management server 10 and the report creation server 20 can recognize that this apparatus information indicates that the customer ID is 00020.

Further, as shown in FIGS. 4A and 4B, the apparatus information of the MFP includes, in addition to the parameter value indicating the customer ID, obtained time ("information code": 001) at which this apparatus information has been obtained; the product name of the corresponding apparatus ("information code": 002); the serial number unique to the corresponding product ("information code": 003); and so forth. Further, since this apparatus information is the apparatus information of the MFP, it includes, as the parameter values unique to the MFP, the total output number of sheets ("information code": 011); duplex output number of sheets ("information code": 012); N in 1 output number of sheets ("information code": 013); color printing number of sheets ("information code": 014); and so forth.

FIGS. 5A and 5B show one example of the apparatus information of the projector according to the embodiment. As shown in a layout diagram at the top left corner of FIG. 5A, FIGS. 5A and 5B are integrated into one figure.

As shown, the apparatus information of the projector is information concerning the corresponding apparatus including "information codes" and "parameter values", the same as the apparatus information of the MFP.

As shown, the apparatus information of the projector includes, in addition to the parameter value indicating the customer ID, obtained time ("information code": 001) at which this apparatus information has been obtained; the product name of the corresponding apparatus ("information code": 002); the serial number unique to the corresponding product ("information code": 003); and so forth. These items of the apparatus information are common and do not depend on the apparatus, and thus, have the same "information codes" as those for the MFP.

However, since this apparatus information is for the projector, this apparatus information includes the parameter values unique to the projector.

For example, lamp time ("information code": 102); total eco-mode lamp time ("information code": 104); lamp standard converted time ("information code": 105); lamp reset number of times ("information code": 106); lamp durability time ("information code": 107 and "information code": 108); and number of mounted lamps ("information code": 109).

As mentioned above, the management programs for collecting the apparatus information are installed in the apparatuses acting as the management targets, respectively. Each one of the apparatuses acting as the management targets internally collects the information concerning the apparatus itself, and transmits the collected apparatus information to the apparatus management server 10 of the apparatus management center 1 periodically or at any timing. The thus transmitted apparatus information is received by the apparatus management server 10, and is stored in the storage part 102. The apparatus management server 10 stores all the apparatus information received by the reception part 101. Thus, in the storage part 102, the apparatus information received from the respective customer sites A, B and C is stored in the state of being mixed together, for example. Further, also as to the apparatus information received from the same customer site A, the apparatus information received from the MFPs a1 to a3 and the projector a4 is stored in the state of being mixed together. Further, since, for example, the apparatus information is periodically transmitted from all the apparatuses that are the management targets, the apparatus information is stored in the storage part 102 each time of the transmission.

[Information Processing 1]

Next, information processing carried out by the apparatus management server 10 will be described. FIG. 6 shows a flowchart of transmission and reception processes of the apparatus information according to the embodiment.

In step S1, each one of the apparatuses that are the management targets (for example, the MFPs a1 to a3, the projector a4, the MFP b1, the projector c1 and so forth) determines whether a transmission time of its own apparatus information has come. As mentioned above, the management programs for collecting the apparatus information are installed in the apparatuses that are the management targets. The transmission time is according to the time previously set in each one of the management programs by the administrator, the apparatus management center 1 or the like. As a specific example of the transmission time, in a case of the MFP, it is preferable to set a time (for example, 0:00 AM or so) at which the MFP rarely operates. In a case of the projector, different from a case of the MFP, the likelihood that the projector operates during 24 hours is low, and thus, the apparatus information may be transmitted each time when the power supply to the projector is started, for example. Further, the transmission time may be determined preferably also in consideration of the network environment.

In step S2, the apparatus that is the management target internally collects the apparatus information of the apparatus itself when its transmission time has come. The contents of the apparatus information to be collected are information necessary for apparatus management and/or for creating a report. Specifically, the contents of the apparatus information to be collected are according to information previously set in the management program by the administrator, the apparatus management center or the like.

In step S3, the apparatus acting as the management target transmits the apparatus information internally collected by itself to the apparatus management server 10. The transmission destination (for example, the IP address of the apparatus management server 10) is according to a transmission destination previously set in the management program by the administrator, the apparatus management center or the like.

In step S4, the apparatus management server 10 (the reception part 101) receives the apparatus information from the apparatus acting as the management target via the network.

In step S5, the apparatus management server (the storage part 102) stores all the apparatus information received by the reception part 101. That is, according to the embodiment, the respective sets of the apparatus information received from the MFPs a1 to a3, the projector a4, the MFP b1 and the projector c1 are stored in the state of being mixed together.

Thus, according to the embodiment, the method of transmitting the apparatus information from the apparatuses to the apparatus management server 10 is employed. As a specific method of the apparatus management server 10 collecting the apparatus information from the apparatuses, a method can also be considered in which the side of the apparatus management server 10 fetches (pulls) the apparatus information from the apparatuses. Specifically, in a case of using simple network management protocol (SNMP), when a method is employed in which a GET command of SNMP is used to fetch management information base (MIB) as the apparatus information from the apparatus acting as the management target, the side of the management server 10 is required to designate Object ID (OID) (it is necessary to designate a value to obtain depending on each one of the apparatuses acting as the management targets).

However, in the case of the embodiment where remote apparatus management will be carried out also for the projectors in addition to the MFPs that are the existing management targets, the apparatus management server 10 side initially only knows the OIDs for obtaining the apparatus information of the MFPs. Thus, it is necessary to add OIDs for newly obtaining the apparatus information of the projectors for the purpose of obtaining the apparatus information of the projectors. That is, the method of the apparatus management server 10 fetching the apparatus information from the apparatuses acting as the management targets is not preferable in the case of keeping modifications and/or the like of the program(s) of the apparatus management server 10 side to the minimum for the purpose of using the existing framework of the apparatus management system as much as possible. In contrast thereto, by employing the method of the apparatus acting as the management target transmitting the apparatus information to the apparatus management server 10 as in the embodiment as mentioned above, it is possible to omit modifying works of the program(s) concerning obtaining the apparatus information of the apparatus management server 10 side. That is, it is not necessary to modify the program(s) to the existing apparatus management server 10 at all.

[Information Processing 2]

Figure 7:
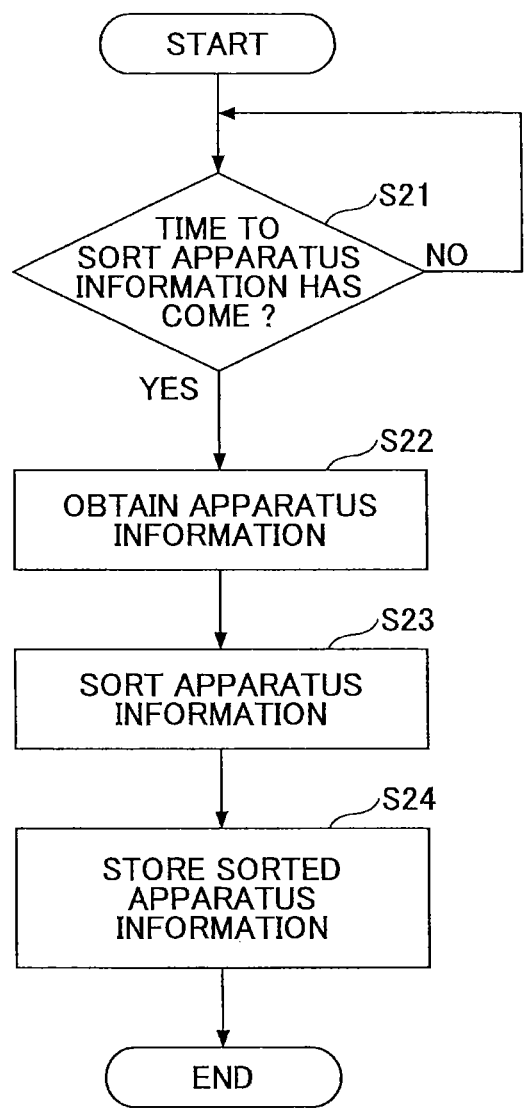
FIG. 7 shows a flowchart of a sorting process of apparatus information according to the embodiment.
Figure 8B:
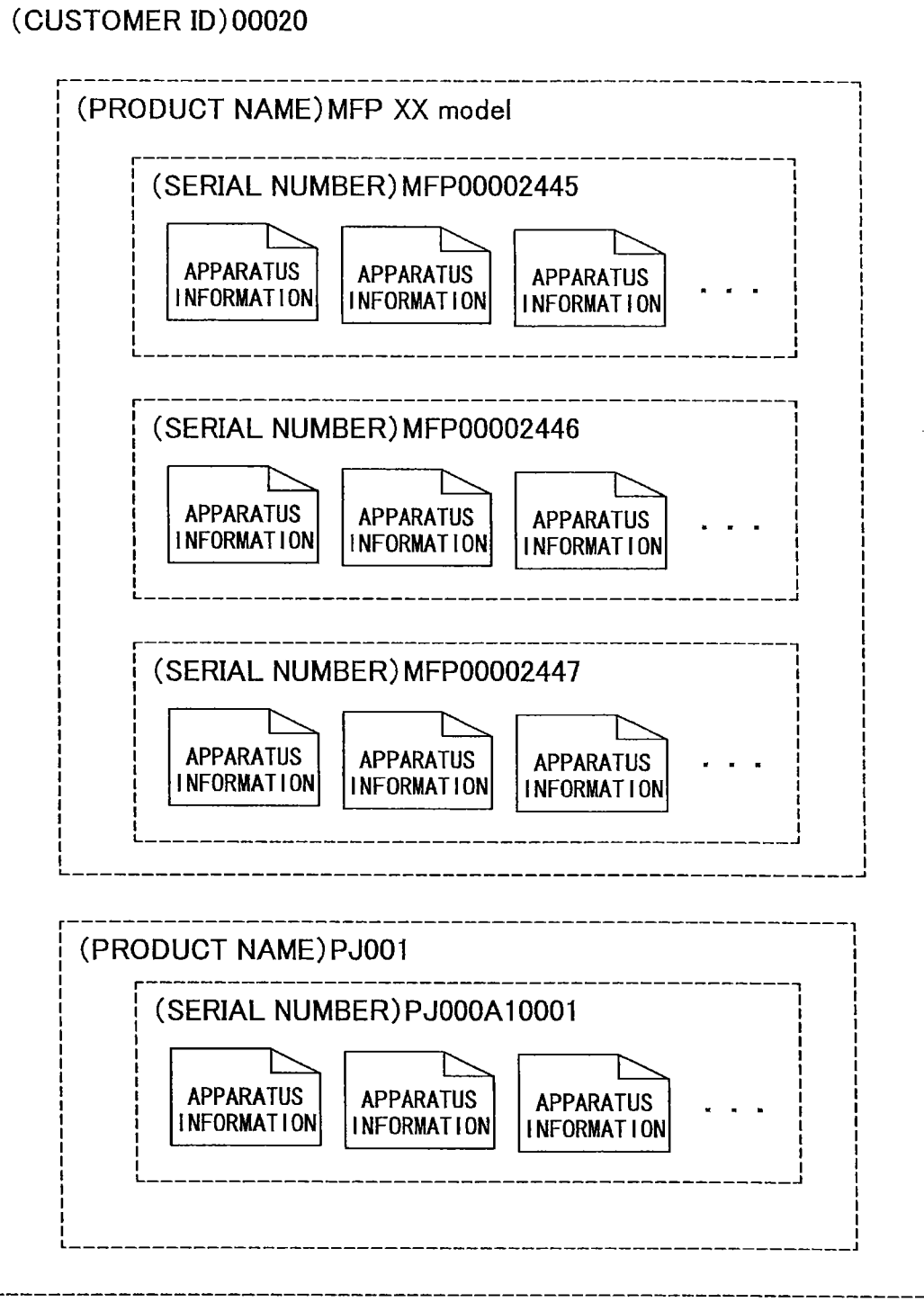
Figure 8C:
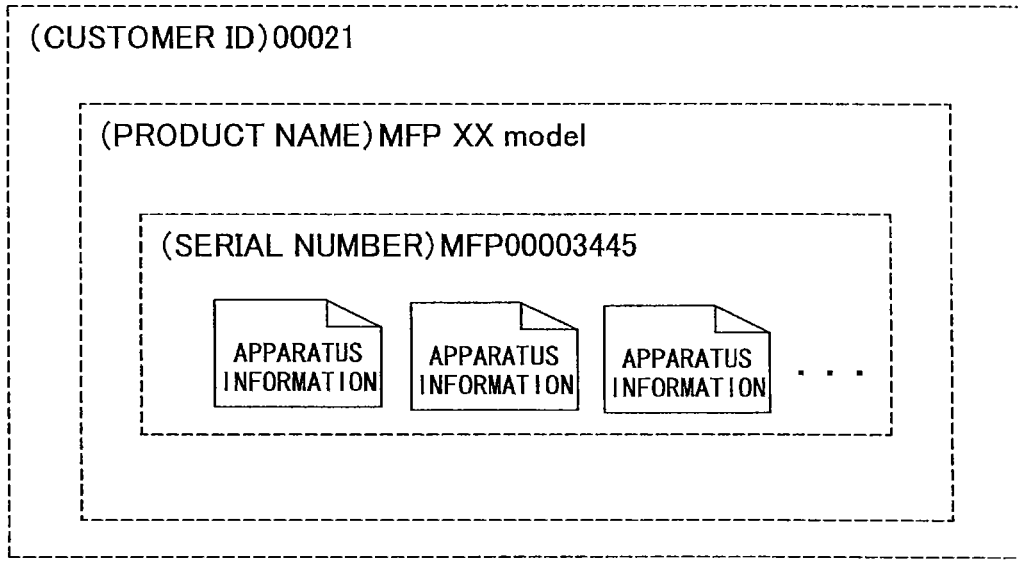
Figure 8D:
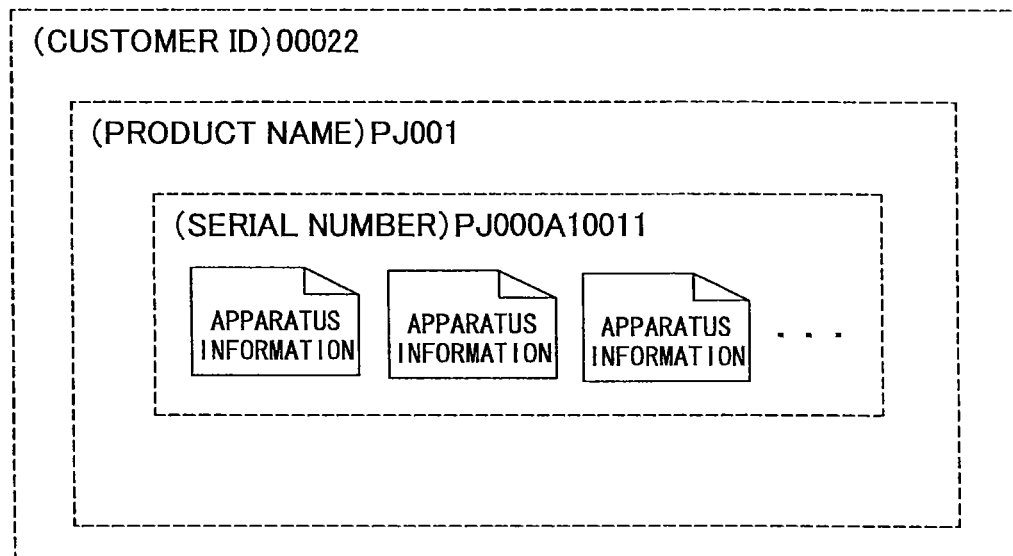

Next, information processing carried out by the report creation server 20 will be described. FIG. 7 shows a flowchart of the sorting process of the apparatus information according to the embodiment.

In step S21, the sorting part 201 of the report creation part 20 determines whether the sorting time of the apparatus information has come. The sorting time is according to a time that is set by the apparatus management center. In particular, as to creation of the report, since it is necessary to provide the report to the customer once a month, for example, the sorting time can be set to the end of each month, for example.

In step S22, when the sorting time of the apparatus information has come, the sorting part 201 obtains the apparatus information that is inside the storage part 202. In particular, upon creating the report, the range of the apparatus information to thus obtain (based on the "obtained time" included in the apparatus information) is the last month.

Next, in step S23, the sorting part 201 sorts the apparatus information for the respective customers, for the respective apparatuses and for the respective apparatus types based on the identifiers included in the apparatus information such as the customer identifiers, the apparatus identifiers and the apparatus type identifies.

FIGS. 8A, 8B, 8C and 8D show how to sort the apparatus information according to the embodiment. As shown in a layout diagram at the top left corner of FIG. 8A, FIGS. 8A to 8D are integrated into one figure.

After obtaining the apparatus information received within the last month, for example, the sorting part 201 sorts the apparatus information for the respective customers, for the respective apparatus types and for the respective apparatuses, based on the customer identifiers ("information code": 000), the apparatus type identifiers ("information code": 002) and the apparatus identifiers ("information code": 003) included in the apparatus information.

As shown in FIGS. 8A to 8D, first, based on the "information code" indicating the customer ID, the apparatus information is sorted for the respective sets of apparatus information of the customer A, the customer B and the customer C. Then, for each one of the customers, for example, for the apparatus information of the customer A, the apparatus information is sorted into the respective sets of apparatus information of the two apparatus types based on the product names (that may be the product apparatus names). Further, for the product name "MFP XX model", the apparatus information is sorted into the respective sets of apparatus information of the three apparatus individuals based on the serial numbers. Similarly, for the apparatus information of the customer B and the customer C, the apparatus information is sorted into the respective sets of apparatus information of the apparatus types based on the product names and is sorted into the respective sets of apparatus information of the apparatus individuals based on the serial numbers.

Thus, by sorting the apparatus information based on the customer identifiers, the apparatus identifiers and the apparatus type identifiers, it is possible to arrange the mixed apparatus information for the respective customers, for the respective apparatuses and for the respective apparatus types. In the case of newly carried out remote apparatus management also for the projectors in addition to the MFPs that are the existing management targets, in the condition where initially only the apparatus information of the MFPs have been considered on the apparatus management server 10 side, it is possible to create the report also for the projectors separately by sorting the apparatus information according to an aspect of the apparatus type based on the apparatus type identifiers ("information code": 002), within the existing framework of the apparatus management system.

It is noted that if such sorting according to the aspect of the apparatus type were not available, the reports might be created without distinguishing between the MFPs and the projectors within the existing framework of the apparatus management system. At this time, since the MFPs and the projectors have the apparatus information unique to the apparatuses such as the parameters of the number of printed sheets of the MFPs and the parameters concerning lamps of the projectors, respectively, it might not be possible to appropriately create the reports of the projectors particularly.

In step S24, the storage part 202 stores, for the respective customers, for the respective apparatus types and for the respective apparatuses, the apparatus information sorted by the sorting part 201. The apparatus information thus sorted and stored is used for creating the reports. Further, the apparatus information can not only be used for the purpose of creating the reports but also be used for other purposes, i.e., maintenance, accounting and so forth.

According to the embodiment, when the apparatus information sorted for the respective customers, for the respective apparatus types and for the respective apparatuses will be stored, the apparatus information sorted for the respective customers, for the respective apparatus types and for the respective apparatuses is edited (integrated) into files for creating the reports. These files will be referred to as "apparatus information edited files".

Figure 9B:
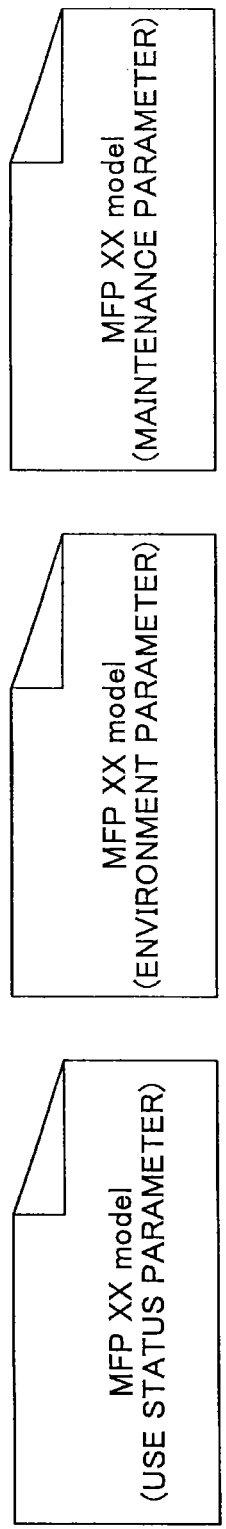
Figure 9C:
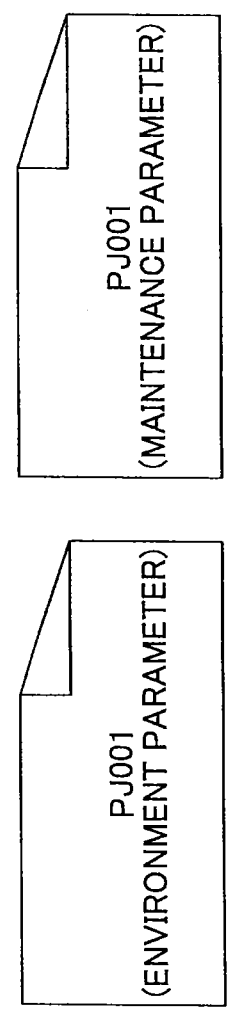

FIGS. 9A, 9B and 9C show one example of the apparatus information edited files (customer A). As shown in a layout diagram at the top left corner of FIG. 9A, FIGS. 9A to 9C are integrated into one figure.

As shown in FIGS. 9A, 9B and 9C, the apparatus information (files) sorted for the respective customers, for the respective apparatus types and for the respective apparatuses (FIG. 9A) is collected, and is integrated and edited into sets of apparatus information for the respective same apparatus types, for the same customer (FIGS. 9B and 9C). For the case of the customer A, the apparatus information collected for the customer A (FIG. 9A) is collected and integrated into the apparatus information edited files of the respective same apparatus types (FIGS. 9B and 9C). For example, in the case of the customer A, the apparatus information for the three MFPs is collected into the apparatus information edited files (FIG. 9B). Similarly, the apparatus information for the one projector is collected into the apparatus information edited files (FIG. 9C). In this case, since the apparatus information edited files will be used for creating the reports, as shown in FIGS. 9B and 9C, the apparatus information edited files are those divided according to aspects for creating the reports for the apparatuses.

That is, in a case of the reports for the MFPs, the report includes the contents concerning status of use, the contents concerning environment and the contents concerning maintenance. Thus, the respective parameters included in the apparatus information are divided into the parameters concerning status of use, the parameters concerning environment and the parameters concerning maintenance, and the corresponding divisions of parameters are collected into the respective apparatus information edited files. Further, for example, for the reports for the projectors, no parameters exist concerning status of use. This is because no concepts exist concerning status of use and/or used amount in the case of the projectors. Thus, the reports for the projectors include the contents concerning environment and the contents concerning maintenance. Thus, in this case, the respective parameters included in the apparatus information are divided into the parameters concerning environment and the parameters concerning maintenance, and the corresponding divisions of parameters are collected into the respective apparatus information edited files. As a result, as shown in FIGS. 9B and 9C, the three apparatus information edited files for the MFPs and the two apparatus information edited files for the projector are created.

It is noted that the file names of the respective apparatus information edited files are obtained from the product names (apparatus type identifiers) indicating the apparatus types and the names of the aspects, for the purpose of identifying the apparatus types ("MFP XX model", "PJ001" and so forth) and the aspects of the apparatus information edited files for creating the reports (the contents concerning status of use, the contents concerning environment, the contents concerning maintenance or the like).

Figure 10B:
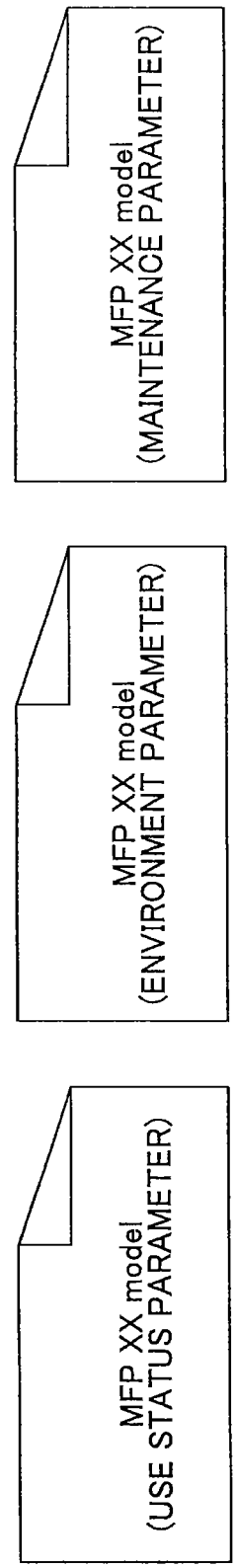
Figure 11B:
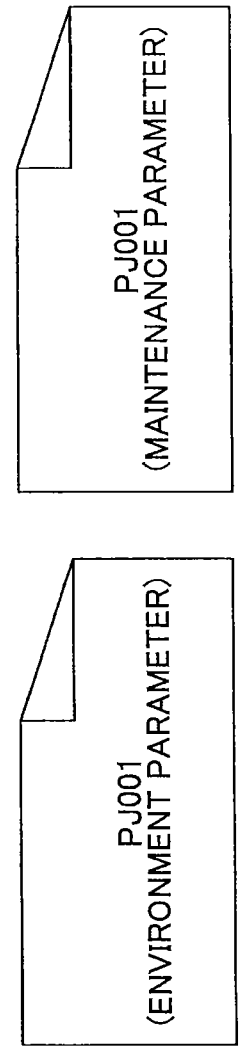

FIGS. 10A and 10B show one example of the apparatus information edited files (customer B) according to the embodiment, and FIGS. 11A and 11B show one example of the apparatus information edited files (customer C) according to the embodiment. As shown in a layout diagram at the top right corner of FIG. 10A, FIGS. 10A and 10B are integrated into one figure. Similarly, as shown in a layout diagram at the top right corner of FIG. 11A, FIGS. 11A and 11B are integrated into one figure.

Figure 12B:
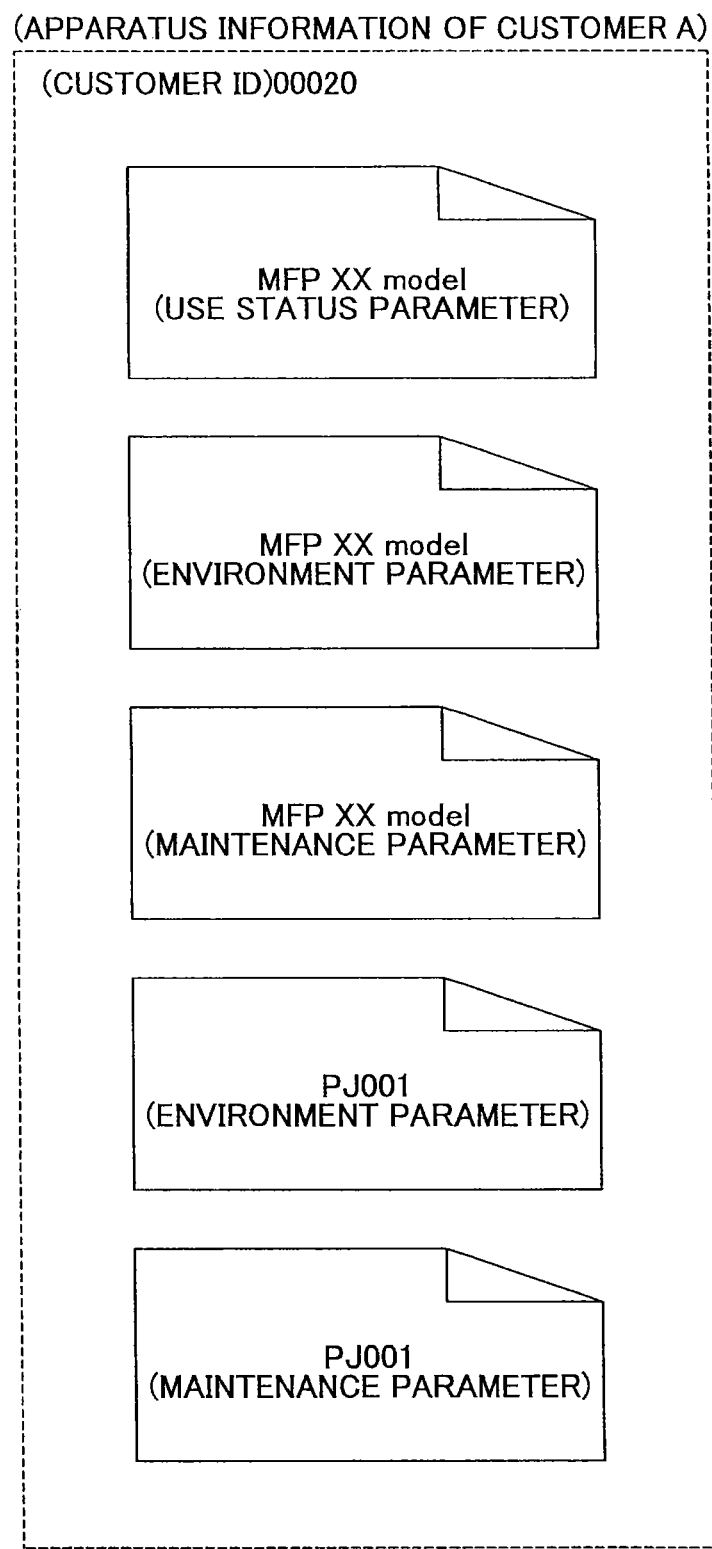

As shown in FIGS. 10A and 10B, the customer B only has the single apparatus type of MFP, and thus, the apparatus information collected from the customer B (FIG. 10A) is edited into the apparatus information edited files for the MFP (FIG. 10B). As a result, the three apparatus information edited files for the MFP are created (FIG. 10B). As shown in FIGS. 11A and 11B, the customer C only has the single apparatus type of projector, and thus, the apparatus information collected from the customer C (FIG. 11A) is edited into the apparatus information edited files for the projector (FIG. 11B). As a result, the two apparatus information edited files for the projector are created (FIG. 11B). The thus created apparatus information edited files shown in FIGS. 12B, 12C and 12D are stored in the storage part 202 shown in FIG. 12A, for the respective customers A, B and C. (As shown in a layout diagram in the lower part of FIG. 12A, FIGS. 12A to 12D are integrated into one figure.)

Thus, in a case of carrying out remote apparatus management also for the projectors in addition to the MFPs that are the existing management targets, the function of sorting the apparatus information is added to the existing report creation server, in particular for the purpose of sorting the apparatus information for the respective apparatus types. That is, in the report creation server 20, the program(s) is(are) modified, in particular for carrying out the apparatus information sorting process for the purpose of sorting the apparatus information for the respective apparatus types. However, as described above, a modification to such an extent of sorting for the respective apparatus types based on the apparatus type identifiers is required, and thus, a considerable amount of modification is not required.

[Information Processing 3]

Figure 13:
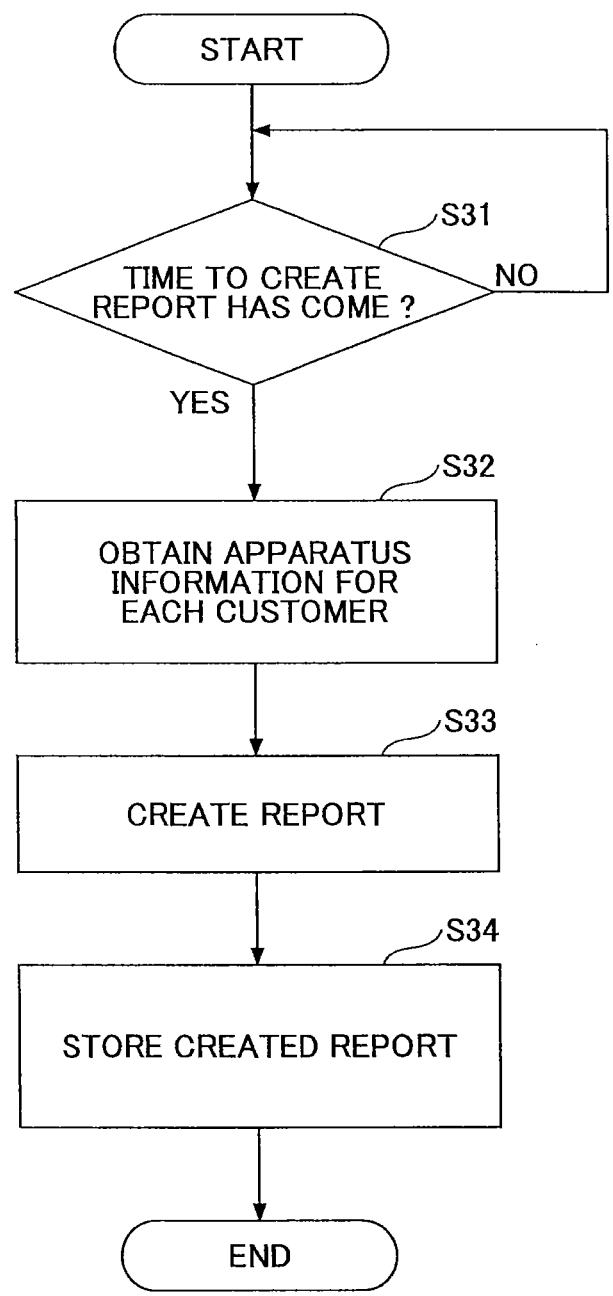
FIG. 13 shows a flowchart of a report creation process according to the embodiment.

Next, information processing carried out by the report creation server 20 will be described. FIG. 13 shows a flowchart of a report creation process according to the embodiment.

In step S31, the report creation part 203 of the report creation server 20 determines whether a creation time of the reports has come. The creation time of the reports is according to a time that is set by the apparatus management center. However, in particular, as to creating the reports, since it is necessary to create the reports for the customer, for example, once a month, the creation time can be set to the end of each month, for example.

In step S32, the report creation part 203 obtains the apparatus information for the respective customers from the storage part 202. As described above, in the storage part 202, the apparatus information sorted for the respective customers, for the respective apparatus types and for the respective apparatuses is stored.

In step S33, based on the apparatus information sorted for the respective customers, for the respective apparatus types and for the respective apparatuses stored in the storage part 202, the report creation part 203 creates the reports. Specifically, the apparatus information has already been obtained for the respective customers in step S32. Then, for a specific customer of the respective customers, the obtained apparatus information (apparatus information edited files) is read. Then, in a case where the apparatus type of the apparatus information is the MFP, the existing report creation program (a report creation program for the MFP) is called, and control is made such that the report for the MFP is created using the existing report creation program.

On the other hand, in a case where the apparatus type of the apparatus information is the projector when the obtained apparatus information has been read, a report creation program for the projector is called, and control is made such that the report for the projector is created using the report creation program for the projector. The report creation program for the projector is a program developed in the report creation server 20 since also the projectors have been added as targets of apparatus management.

It is noted that it is possible to determine whether to call the existing report creation program or the report creation program for the projectors by a method of using the file names of the files. As mentioned above, the file names of the apparatus information edited files are obtained from the product names (apparatus type identifiers) indicating the apparatus types of the apparatuses for which of the apparatus information edited files are thus integrated and the names of the aspects thereof. Thus, by reading the file names of the apparatus information edited files, it is possible to rapidly determine whether the apparatus information included in the apparatus information edited file is one of the MFP(s) or the projector(s).

Specifically, with reference to FIGS. 12B to 12D, for the customer A (FIG. 12B), according to the file name "MFP XX model" of the apparatus information edited file, it can be seen that the corresponding apparatus information edited file is a file in which the apparatus information of one or more MFPs is integrated. On the other hand, according to the file name "PJ001" of the apparatus information edited file, it can be seen that the corresponding apparatus information edited file is a file in which the apparatus information of one or more projectors is integrated. Thus, for the three apparatus information edited files "MFP XX model" shown in FIG. 12B, the existing report creation program (report creation program for the MFPs) is called, and the report concerning the MFP(s) is created using the existing report creation program.

For the two apparatus information edited files "PJ001" shown in FIG. 12B, the report creation program for the projectors is called, and the report concerning the projector(s) is created using the report creation program for the projectors.

Similarly, for the customer B (FIG. 12C), according to the file name "MFP XX model" of the apparatus information edited file, it can be seen that the corresponding apparatus information edited file is a file in which the apparatus information of one or more MFPs is integrated. Thus, for the three apparatus information edited files "MFP XX model" shown in FIG. 12C, the existing report creation program (report creation program for the MFPs) is called, and the report concerning the MFP(s) is created using the existing report creation program. As to the customer C (FIG. 12D), according to the file name "PJ001" of the apparatus information edited file, it can be seen that the corresponding apparatus information edited file is a file in which the apparatus information of one or more projectors is integrated. Thus, for the two apparatus information edited files "PJ001" shown in FIG. 12D, the report creation program for the projectors is called, and the report concerning the projector(s) is created using the report creation program for the projectors.

It is noted that, there is a method of using the number of the created files. As mentioned above, the three apparatus information edited files are created for the MFP(s) and the two apparatus information edited files are created for the projector(s). For example, as shown in FIG. 12C, for the customer B, the three apparatus information edited files exist. From this fact that the number of created files is three, it can be seen that these apparatus information edited files are those in which the apparatus information of the MFP(s) is integrated. Thus, for the three apparatus information edited files "MFP XX model" shown in FIG. 12C, the existing report creation program (report creation program for the MFPs) is called, and the report concerning the MFP(s) is created using the existing report creation program.

Similarly, as shown in FIG. 12D, for the customer C, the two apparatus information edited files exist. From this fact that the number of created files is two, it can be seen that these apparatus information edited files are those in which the apparatus information of the projector(s) is integrated. Thus, for the two apparatus information edited files "PJ001" shown in FIG. 12D, the report creation program for the projectors is called, and the report concerning the projector(s) is created using the report creation program for the projectors.

For the customer A (FIG. 12B), the five apparatus information edited files exist. From the fact that the number of created files is five, it can be seen that these apparatus information edited files are those in which the apparatus information of the MFP(s) and the apparatus information of the projector(s) are integrated. However, it is not possible to determine, for which of the apparatus information edited files, the existing report creation program (report creation program for the MFPs) is to be called, and for which of the apparatus information edited files, the report creation program for the projectors is to be called. Thus, in this case, as mentioned above, the determination may be made by reading the file names of the apparatus information edited files.

FIGS. 14A, 14B, 14C, 14D, 14E, 14F and 14G and FIGS. 15A, 15B and 15C show examples of the reports according to the embodiment. As shown in FIG. 14A, FIGS. 14B to 14H show the respective parts of FIG. 14A.

For example, the customer A has, as mentioned above, the three MFPs a1 to a3 and the one projector a4, and the apparatus information is transmitted from these apparatuses. The apparatus information thus transmitted from the respective apparatuses is sorted as shown in FIG. 12B. Then, these apparatus information edited files are read, and, based on, for example, the file names or the number of files of the apparatus information edited files, existing report creation program (report creation program for the MFPs) or the report creation program for the projectors is called. Then, by the respective called programs, based on the apparatus information included in the apparatus information edited files, the reports for the three MFPs a1 to a3 and the reports for the one projector a4 are created.

Figure 14A:
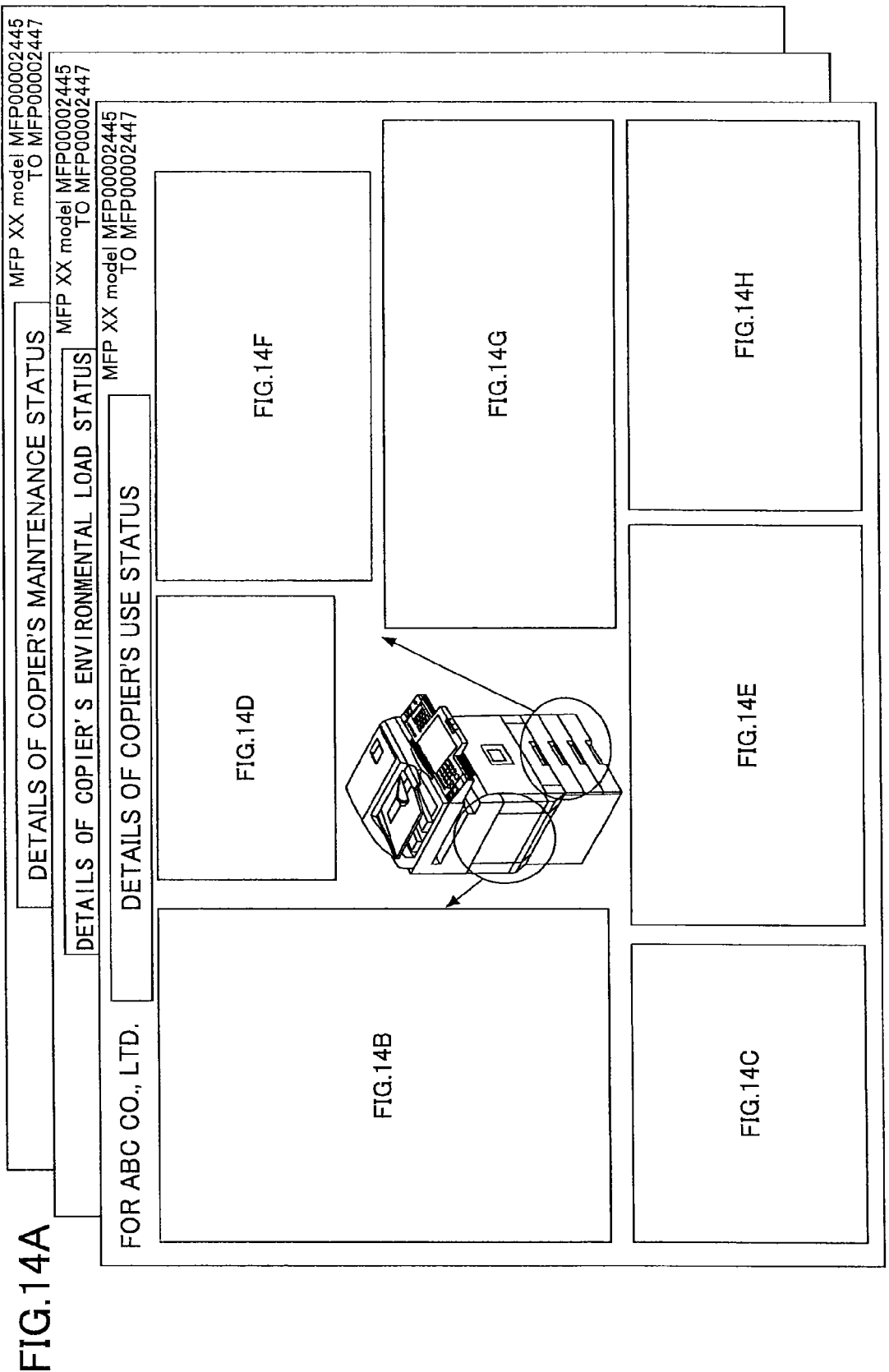
FIGS. 14A, 14B, 14C, 14D, 14E, 14F, 14G and 14H show one example of a report according to the embodiment.
Figure 14B:
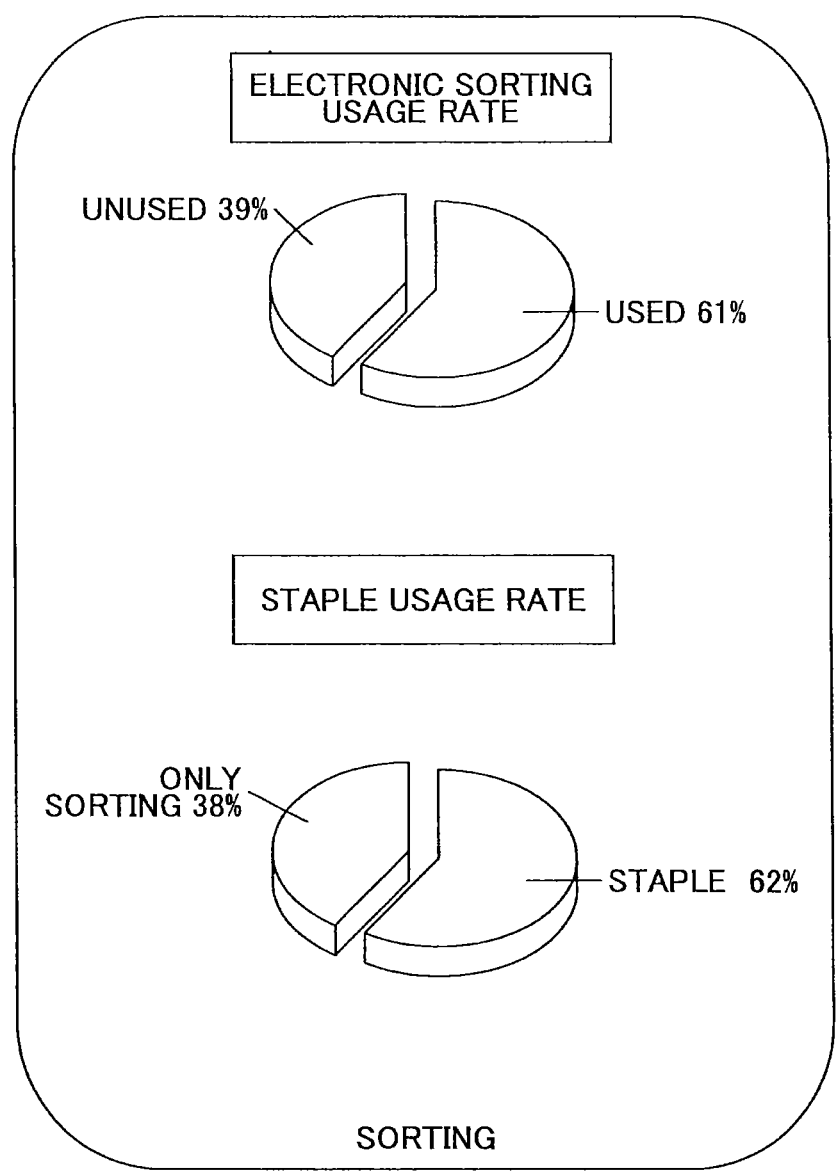
Figure 14C:
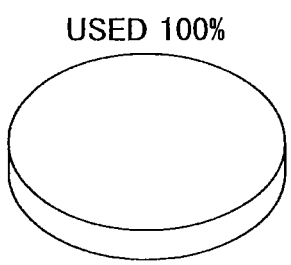
Figure 14D:
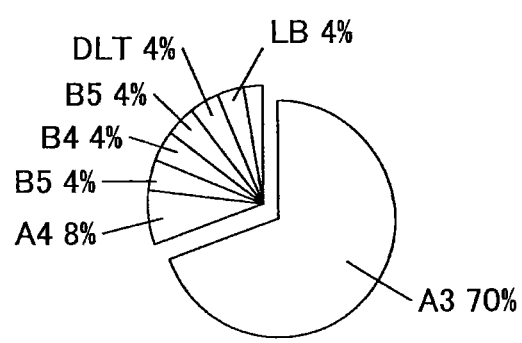
Figure 14E:
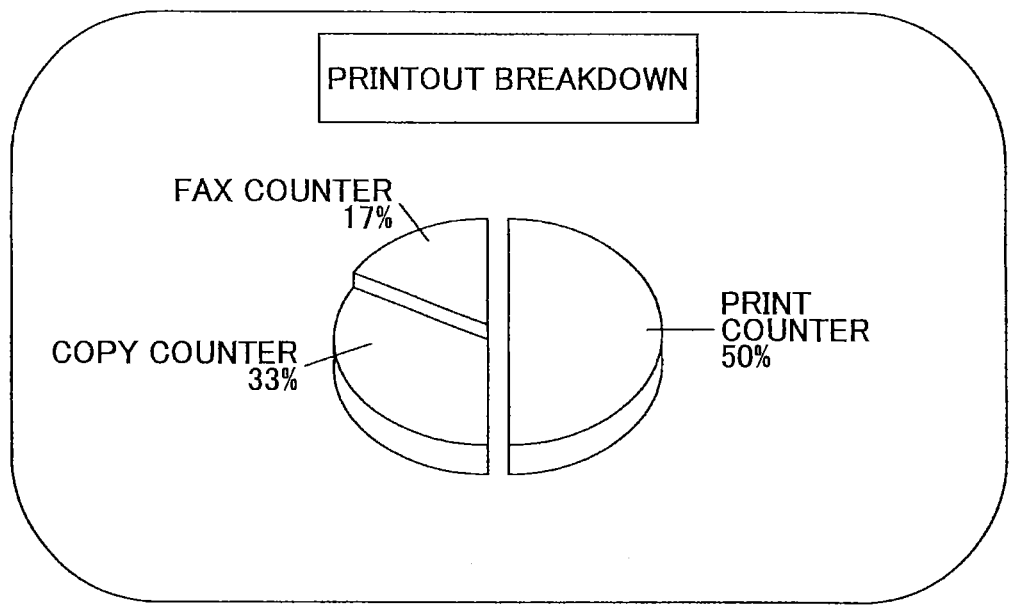
Figure 14F:
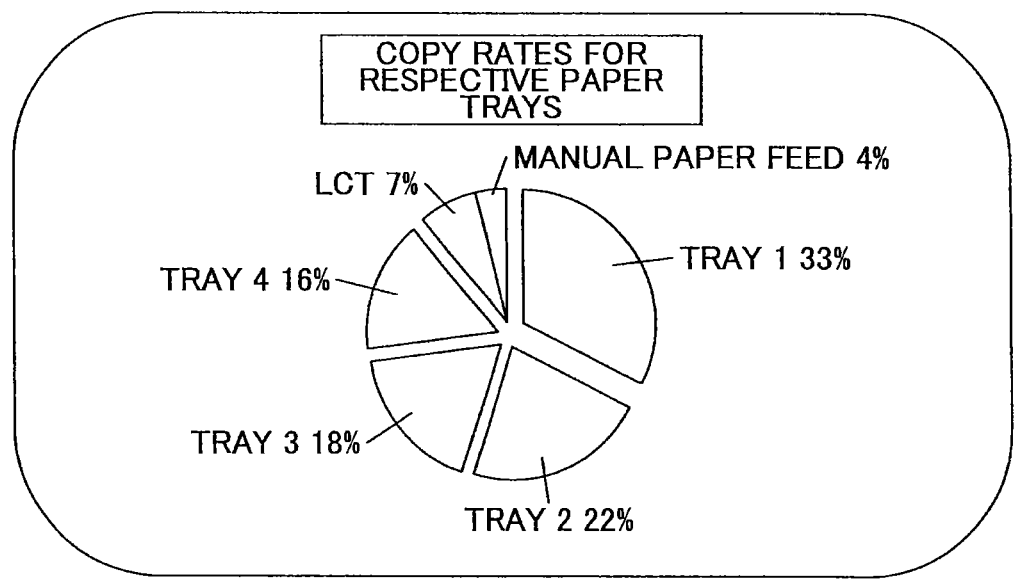
Figure 14G:
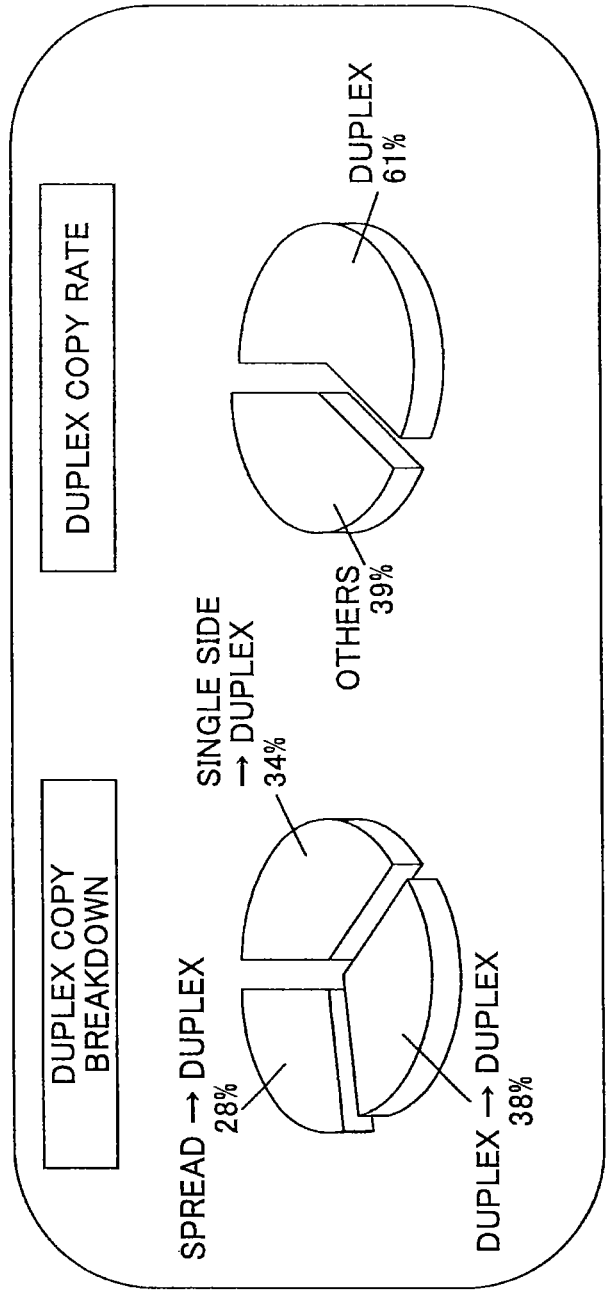
Figure 14H:
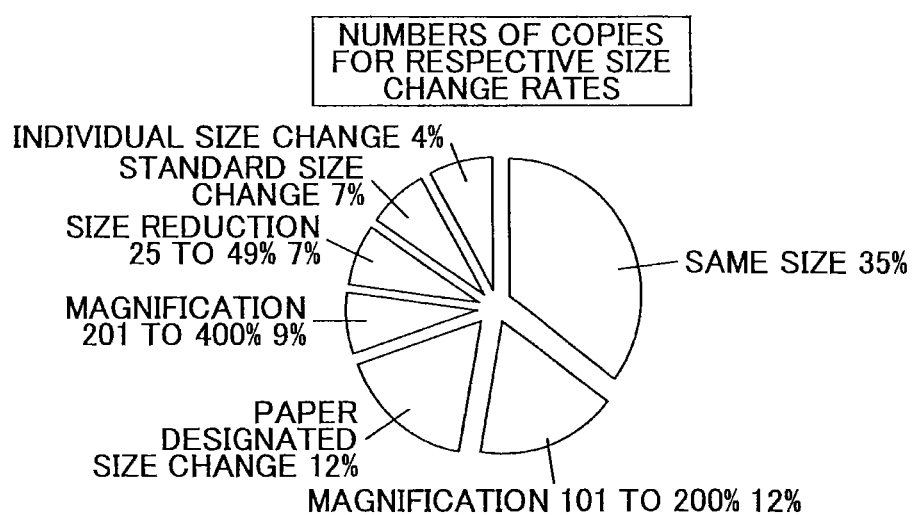

For example, three reports shown in FIG. 14A are created by the existing report creation program (the report creation program for the MFPs) based on the three apparatus information edited files "MFP XX model" (see FIG. 12B). That is, the report of the first sheet "details of copier's use status" is created based on the apparatus information edited file "MFP XX model (use status parameter)". The report of the second sheet "details of copier's environmental load status" is created based on the apparatus information edited file "MFP XX model (environment parameter)". The report of the third sheet "details of copier's maintenance status" is created based on the apparatus information edited file "MFP XX model (maintenance parameter)".

Figure 15A:
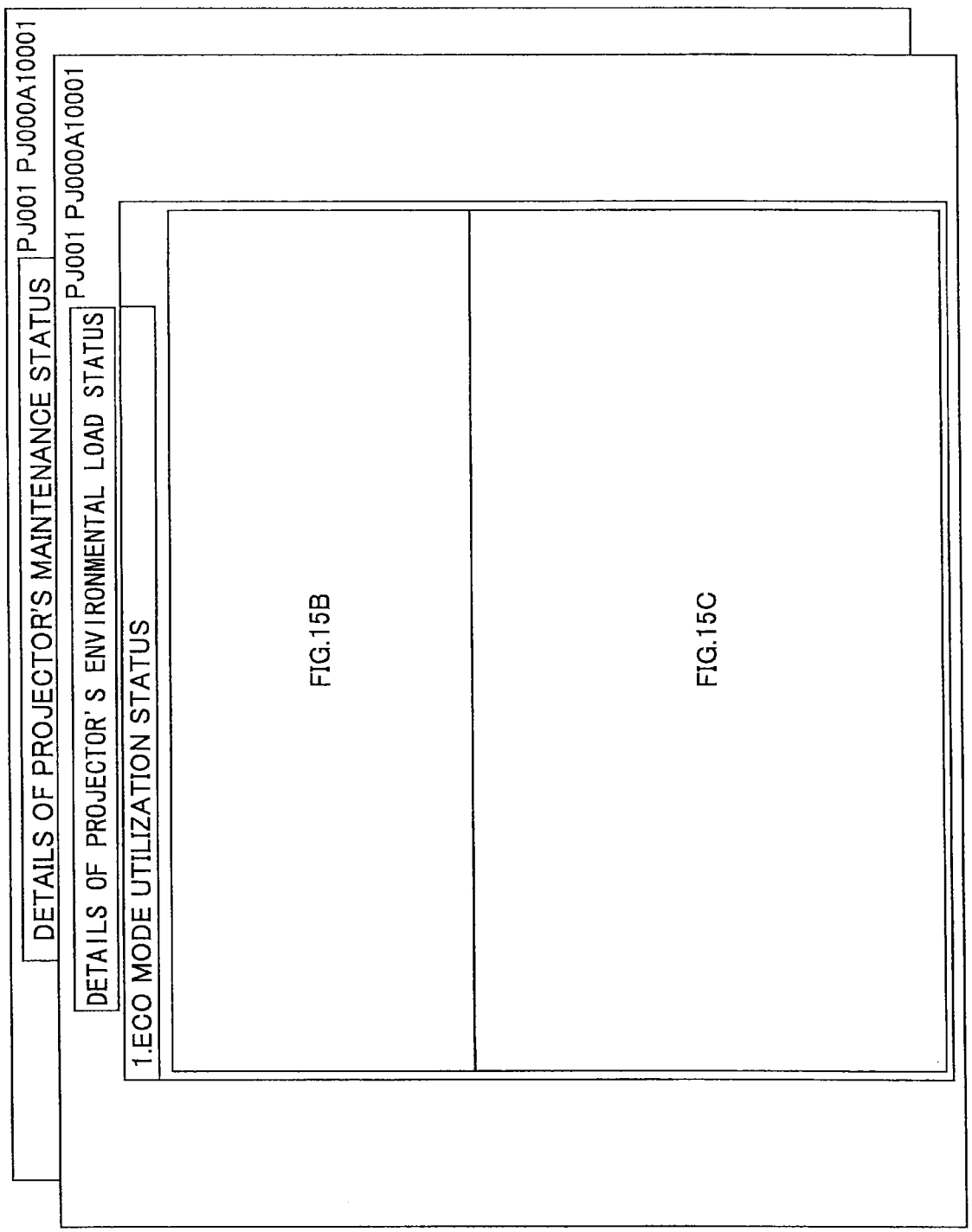
FIGS. 15A, 15B and 15C show one example of a report according to the embodiment.
Figure 15B:
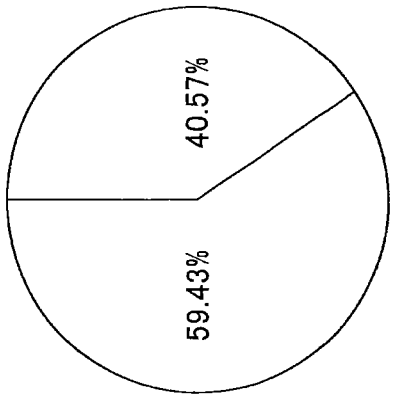
Figure 15C:
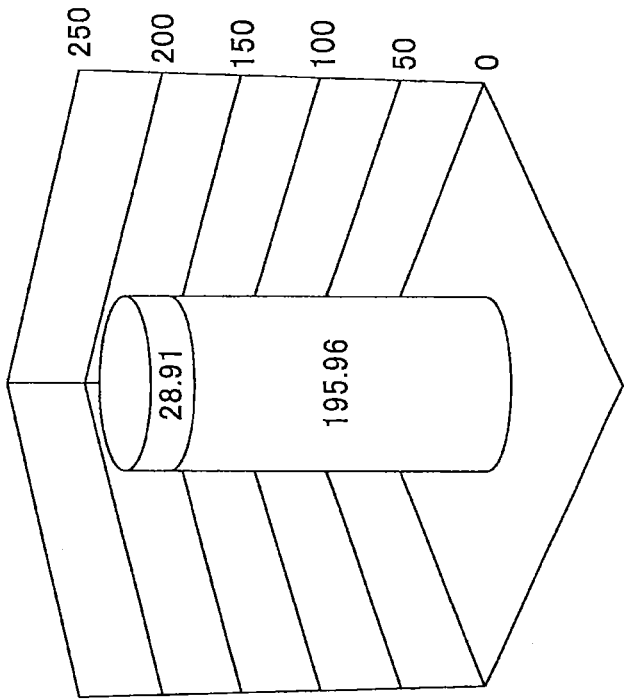

For example, two reports shown in FIG. 15A are created by the report creation program for the projectors based on the two apparatus information edited files "PJ001" (see FIG. 12B). That is, the report of the first sheet "details of projector's environmental load status" is created based on the apparatus information edited file "PJ001 (environment parameter)". The report of the second sheet "details of projector's maintenance status" is created based on the apparatus information edited file "PJ001 (maintenance parameter)". Of course, the contents, formats and so forth of these reports shown in FIGS. 14A to 14H and FIGS. 15A to 15C are just examples, and the contents, formats and so forth of the reports are not limited thereto. (As shown in FIG. 15A, FIGS. 15B and 15C show the respective parts of FIG. 15A.)

For the customer B, the one MFP b1 is installed. For the customer C, the one projector c1 is installed. Thus, for the customer B, the reports for the one MFP b1 is created. For the customer C, the reports for the one projector c1 created.

Returning to FIG. 13, in step S34, the report creation part 203 stores the reports thus created by the report creation part 203 in the storage part 204 for the respective customers. The reports thus stored may be transmitted to the customers via e-mail or the like. Alternatively, a Web site for reading the reports may be prepared, and the reports may be provided to the customers via the Web site.

Thus, in a case of also creating the reports for the projectors in addition to the MFPs that are the existing management targets, the report creation process for the projectors is added to the existing report creation server. That is, in the report creation server 20, the program (the report creation program for the projectors) is developed (added) for carrying out the report creation process for the projectors, in particular for the purpose of creating the reports for the projectors. The report creation process for the MFPs is carried out by the existing report creation program (the report creation program for the MFPs) as before. Thus, by only adding the function of determining whether to call the newly developed (added) report creation program for the projectors depending on the apparatus information (apparatus information edited file), any further modification of the report creation server 20 is unnecessary.

[Variant of Embodiment]

A report creation process according to a variant of the embodiment will now described.

Figure 16:
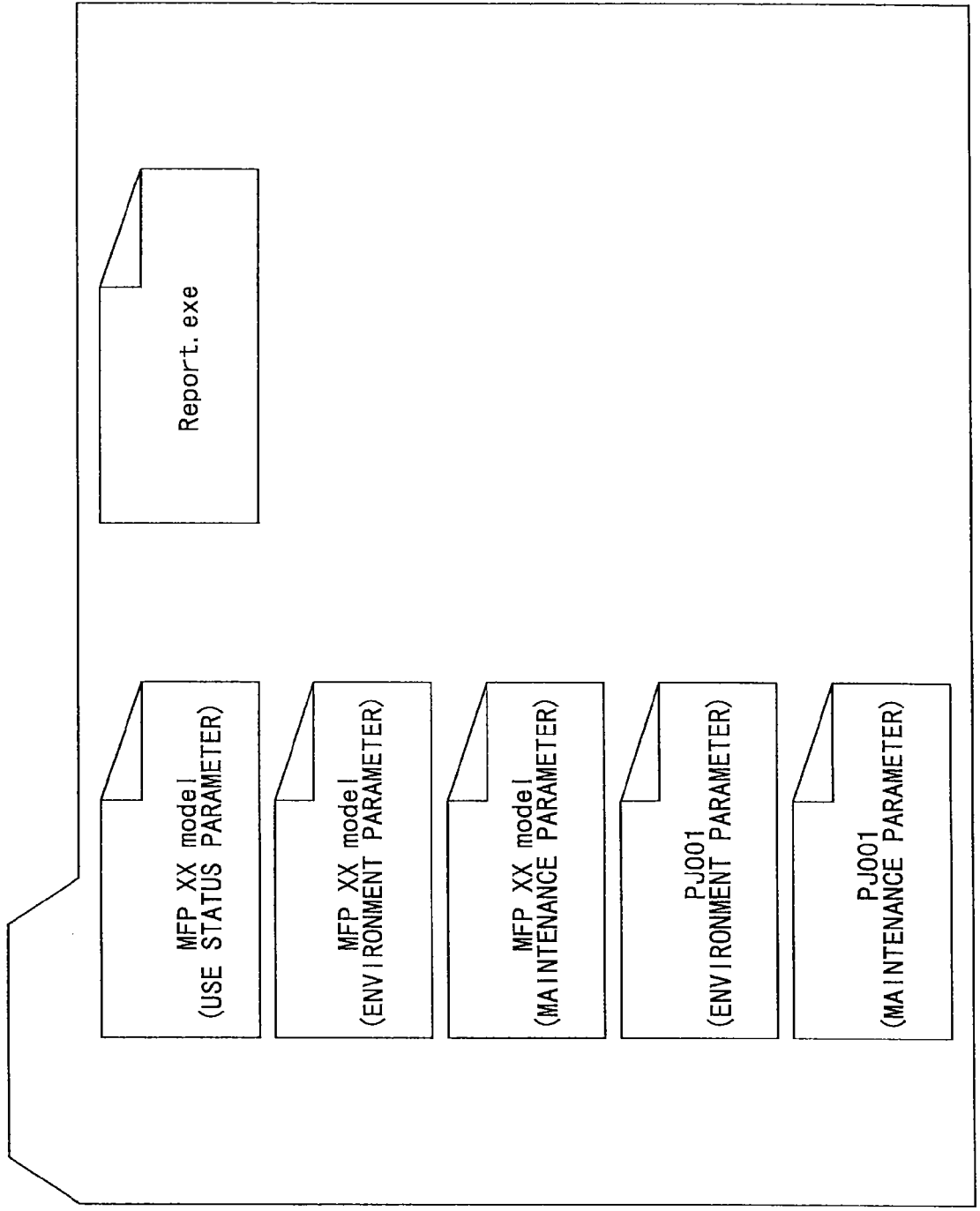
FIG. 16 shows one example of a report according to a variant of the embodiment.

FIG. 16 shows one example of the report according to the variant of the embodiment. That is, in step S33 of FIG. 13, the report creation part 203 obtains the apparatus information edited files (the three files "MFP XX model" and the two files "PJ001", see FIG. 16) themselves for the respective customers stored in the storage part 202. Further, a previously prepared executable file ("Report.exe", see FIG. 16) is added. The information including the thus obtained apparatus information edited files and the executable file is to be provided to the customer as "information corresponding to the reports".

The executable file is a file of a program (or an equivalent thereof) of an executable form. When the customer causes the executable file to be executed, for example, by carrying out an operation of double clicking on the corresponding icon on the display screen, the apparatus information edited files included in the same folder are read, and thus, final reports are output (created). Thus, as shown in FIG. 16, when the "Report.exe" has been executed, the three apparatus information edited files "MFP XX model" and the two apparatus information edited filed "PJ001" are read, and the reports are created based on these apparatus information edited files.

Upon being executed, the executable file reads the apparatus information edited file included in the same folder. In a case where the apparatus type of the apparatus information is the MFP, an existing report creation module incorporated in the executable file is used, and the reports concerning the MFP(s) are created (for example, as shown in FIGS. 14A to 14G). On the other hand, in a case where the apparatus type of the apparatus information is the projector when the executable file has read the apparatus information edited file included in the same folder, a report creation module for the projectors incorporated in the executable file is used, and the reports concerning the projector(s) are created (for example, as shown in FIGS. 15A to 15C). Thus, in this variant of the embodiment, as a result of also the projectors having been added as targets of apparatus management, the executable file is a file modified in such a manner that the report creation module for the projectors is added in the file.

Also in this case, it is possible to determine whether to call the existing report creation module or the report creation module for the projectors for the apparatus information edited file, using the file name or the number of files, as described above.

Further, it is also possible that the executable file is replaced by general-purpose spreadsheet software such as "Excel" (registered trademark), and a programming function such as VBA is used to perform the same functions.

Further, in this variant of the embodiment, in step S34 of FIG. 13, the storage part 204 stores the "information corresponding to the reports" created by the report creation part 203 for the respective customers. Then, the thus stored "information corresponding to the reports" may be provided to the customers via e-mail or the like after being compressed, for example.

[Summary of Embodiments]

As described above, a case will be assumed where, for example, a business operator will carry out remote apparatus management also for new apparatuses different from apparatuses that are existing management targets, such as a case where the new apparatuses have been brought into the market, or handling of new apparatuses of another manufacturer has been started. In such a case, when the new apparatuses are of completely or considerably different apparatus types from the apparatuses that are the existing management targets, it may be difficult to carry out remote apparatus management also for the new apparatuses using the existing framework of the apparatus management system. However, the apparatus management system 100 according to the embodiments can also carry out remote apparatus management on the new apparatuses in a manner the same as or similar to that for the apparatuses that are the existing management targets, by a small amount of system modification concerning apparatus management on the existing apparatus management system (including the apparatus management server and the report creation server).

By the embodiments described above, it is possible to provide an apparatus management system, an apparatus management method and a computer readable information recording medium, by which, it is possible to carry out the same or similar remote apparatus management even for a new apparatus having an apparatus type different from an apparatus that is an existing management target, only by partially modifying the system while utilizing the framework of the existing apparatus management system.

The apparatus management system and the apparatus management method have been described by the embodiments. However, the present invention is not limited to the specifically disclosed embodiments, and variations and modifications may be made without departing from the scope of the present invention.

For example, the apparatus management server 10 may integrate the function(s) of the report creation server 20 (for example, the sorting function and the report creation function).

It is possible to apply the features, the expressions or any combinations of the features of the above-described embodiments to a method, an apparatus, a system, a computer program, a recording medium and so forth, as embodiments.

The present application is based on Japanese Priority Application No. 2012-001562 filed on Jan. 6, 2012 and Japanese Priority Application No. 2012-262102 filed on Nov. 30, 2012, the entire contents of which are hereby incorporated herein by reference.

What is claimed is:

1. An apparatus management system connected with a first apparatus and a second apparatus via a network, the system comprising:
 at least one processor, wherein
  the at least one processor receives, at a first timing, first apparatus information including a parameter unique to the first apparatus from the first apparatus,
  the at least one processor receives, at a second timing different from the first timing, second apparatus information including a parameter unique to the second apparatus from the second apparatus,
  the at least one processor stores the first apparatus information and the second apparatus information in a storage device,
  the at least one processor creates, based on the first apparatus information stored in the storage device, a first report for reporting a status of the first apparatus to a customer of the first apparatus,
  the at least one processor creates, based on the second apparatus information stored in the storage device, a second report for reporting a status of the second apparatus to a customer of the second apparatus,
  when the customers of the first apparatus and the second apparatus are the same, the at least one processor provides the first report and the second report to the customer together,
  the first apparatus information includes a first apparatus type identifier indicating a type of the first apparatus and the second apparatus information includes a second apparatus type identifier indicating a type of the second apparatus, and
  the at least one processor creates the first report and the second report according to the apparatus type identifiers included in the first apparatus information and the second apparatus information stored in the storage device.

2. The apparatus management system according to claim 1, wherein the at least one processor creates the first report and the second report at a predetermined timing.

3. The apparatus management system according to claim 1, wherein the at least one processor creates the first report and the second report periodically.

4. A method performed by an apparatus management system connected with a first apparatus and a second apparatus via a network, the method comprising:
 receiving, at a first timing, first apparatus information including a parameter unique to the first apparatus from the first apparatus,
 receiving, at a second timing different from the first timing, second apparatus information including a parameter unique to the second apparatus from the second apparatus,
 storing the first apparatus information and the second apparatus information in a storage device,
 creating, based on the first apparatus information stored in the storage device, a first report for reporting a status of the first apparatus to a customer of the first apparatus,
 creating, based on the second apparatus information stored in the storage device, a second report for reporting a status of the second apparatus to a customer of the second apparatus, and
 when the customers of the first apparatus and the second apparatus are the same, providing the first report and the second report to the customer together, wherein
 the first apparatus information includes a first apparatus type identifier indicating a type of the first apparatus and the second apparatus information includes a second apparatus type identifier indicating a type of the second apparatus, and
 the creating the first report and the creating the second report include creating the first report and the second report according to the apparatus type identifiers included in the first apparatus information and the second apparatus information stored in the storage device.

5. The method according to claim 4, wherein the first report and the second report are created at a predetermined timing.

6. The method according to claim 4, wherein the first report and the second report are created periodically.

7. A non-transitory computer-readable storage medium storing computer-readable instructions thereon which, when executed by an apparatus management system connected with a first apparatus and a second apparatus via a network, cause the apparatus management system to perform a method comprising:
 receiving, at a first timing, first apparatus information including a parameter unique to the first apparatus from the first apparatus,
 receiving, at a second timing different from the first timing, second apparatus information including a parameter unique to the second apparatus from the second apparatus,
 storing the first apparatus information and the second apparatus information in a storage device,
 creating, based on the first apparatus information stored in the storage device, a first report for reporting a status of the first apparatus to a customer of the first apparatus,
 creating, based on the second apparatus information stored in the storage device, a second report for reporting a status of the second apparatus to a customer of the second apparatus, and
 when the customers of the first apparatus and the second apparatus are the same, providing the first report and the second report to the customer together, wherein
 the first apparatus information includes a first apparatus type identifier indicating a type of the first apparatus and the second apparatus information includes a second apparatus type identifier indicating a type of the second apparatus, and
 the creating the first report and the creating the second report include creating the first report and the second report according to the apparatus type identifiers included in the first apparatus information and the second apparatus information stored in the storage device.

8. The non-transitory computer-readable storage medium according to claim 7, wherein the first report and the second report are created at a predetermined timing.

9. The non-transitory computer-readable storage medium according to claim 7, wherein the first report and the second report are created periodically.

* * * * *